United States Patent [19]

Herrero Garcia et al.

[11] Patent Number: 5,187,735
[45] Date of Patent: Feb. 16, 1993

[54] INTEGRATED VOICE-MAIL BASED VOICE AND INFORMATION PROCESSING SYSTEM

[75] Inventors: José E. Herrero Garcia; Carlos R. Jiménez Rodriquez, both of Guaynabo, P.R.

[73] Assignee: Tele Guia Talking Yellow Pages, Inc., Guaynabo, P.R.

[21] Appl. No.: 517,665

[22] Filed: May 1, 1990

[51] Int. Cl.$^5$ .............................................. H04M 1/64
[52] U.S. Cl. ....................................... 379/88; 379/67; 379/211; 379/212; 358/85
[58] Field of Search ....................... 379/67, 88, 89, 84, 379/212, 211, 213, 214, 399, 96, 97, 98; 358/85, 86, 142, 84

[56] References Cited

U.S. PATENT DOCUMENTS

| | | |
|---|---|---|
| 3,614,328 | 10/1971 | McNaughton . |
| 4,071,697 | 1/1978 | Bushnell et al. . |
| 4,096,363 | 6/1978 | Earp ......................................... 379/399 |
| 4,367,548 | 1/1983 | Cotten, Jr. et al. . |
| 4,451,700 | 5/1984 | Kempner et al. . |
| 4,554,418 | 11/1985 | Toy . |
| 4,612,416 | 9/1986 | Emerson et al. . |
| 4,646,346 | 2/1987 | Emerson et al. . |
| 4,659,877 | 12/1987 | Dorsey et al. . |
| 4,700,378 | 10/1987 | Brown . |
| 4,716,583 | 12/1987 | Groner et al. . |
| 4,734,931 | 3/1988 | Bourg et al. . |
| 4,757,267 | 7/1988 | Riskin ...................................... 379/84 |
| 4,788,682 | 11/1988 | Vij et al. ................................. 379/96 |
| 4,790,003 | 12/1988 | Kepley et al. . |
| 4,792,968 | 12/1988 | Katz ......................................... 379/67 |
| 4,809,321 | 2/1989 | Morganstein et al. ............... 379/214 |
| 4,812,843 | 3/1989 | Champion, III et al. . |
| 4,837,797 | 6/1989 | Freeny, Jr. . |
| 4,837,798 | 6/1989 | Cohen et al. . |
| 4,926,462 | 5/1990 | Ladd et al. ............................ 379/198 |

OTHER PUBLICATIONS

Blount, "Talking Yellow Pages," *Target Marketing*, vol. 10, No. 10, p. 40, Oct. 1987.

"Interactive Voice Information System" and other publications, Brite Voice Systems, Inc., 1989.
"Net launches Enhanced Services With Uniform Interface," *Boc Week*, vol. 6, No. 27, p. 2, Jul. 17, 1989.
"Voice Processing: Defining Terms" and other articles, *Teleconnect*, pp. 64–108, Apr. 1989.
Blankenhorn, "The Gateway Connection," *Sky*, p. 56, Aug. 1989.
"The Boom Has Begun" and other articles, *Teleconnect*, pp. 61–119 & 128–155, Apr. 1988.
"Dytel Automated Attendant Exchange System Improves Productivity, Response to Incoming Calls and Operator Flexibility in the Office," *Caribbean Business*, Sep. 28, 1989.

(List continued on next page.)

Primary Examiner—Jin F. Ng
Assistant Examiner—Huyen D. Le
Attorney, Agent, or Firm—Nixon & Vanderhye

[57] ABSTRACT

An innovative "one-stop" full service telephone call-/communications handling system combining voice mail, voice recognition, database handling and networking features into an integrated system provides highly cost effective solutions for even small organization and individual users. A voice mail system is programmed to automatically answer incoming telephone calls from incoming sources, and offers callers different options depending upon the number they call in on. Some incoming telephone lines are dedicated to particular services or types of callers, while other incoming lines provide a more general public interface for a variety of services offered by the system. The system of the present invention provides a more generalized interface offering callers a variety of different functions/operations/capabilities, including electronic yellow pages, long distance credit card calling services, voice mail and voice conversion, one-stop travel arrangements, and high quality voice mail audio prompts.

18 Claims, 19 Drawing Sheets

OTHER PUBLICATIONS

Centigram sales literature:including: "Media Information," Receptionist II, VoiceMemo System Highlights—Release 5.0, Mesa-Net, VoiceMemo II, Who Needs It . . .VoiceMemo II, Application Notes United Telephone of Florida . . . , Adding Voice Messaging . . . , and *VoiceMemo Installation and Maintenance Manual*, Centigram Corp. pp. 25–28, 39–42 and 75–76, San Jose, Calif., Aug. 1989.

Centigram media information: "Centigram Corporation Annouces VoiceMemo Software Release 5.01," San Diefo, CA, 2 pp, Sep. 26, 1989; Nynex Selects Centrigram's VoiceMemo II Voice Processing System for Central Office Use, San Jose, Calif., 2 pp, Sep. 11, 1989; Centrigram Communications Corporation, 8 pp, Mar. 1990; Corporate Highlights, 3 pp, Mar. 1990; and Centigram Corporation, and Voice-Tel Sign $15 Million Voice Messaging Network Agreement, San Jose, Calif.. 4 pp, Feb. 2, 1990.

"Voice-Tel Franchises Voice Memo Offers Nationwide Digital Network," Voice Memos, *News and Trends in Voice Messaging Technology and Products*, vol. 1, No. 5, pp. 1–4, Jan./Feb. 1990.

"Speech Plus, Inc. Corporate Highlights," CallTex Voice Gateway System, CallText VGS, CallText VGS/x, CallText VGSdv, Audio EMAIL, Automated Toll Investigation System, Audio Locator, Audio Dispatch, publications of *Speech Plus Inc.*, Sunnyvale, Calif., 1988.

Moccardi, "The Compleat Guide to ACDs, 1988," *Teleconnect*, p. 128, Apr. 1988.

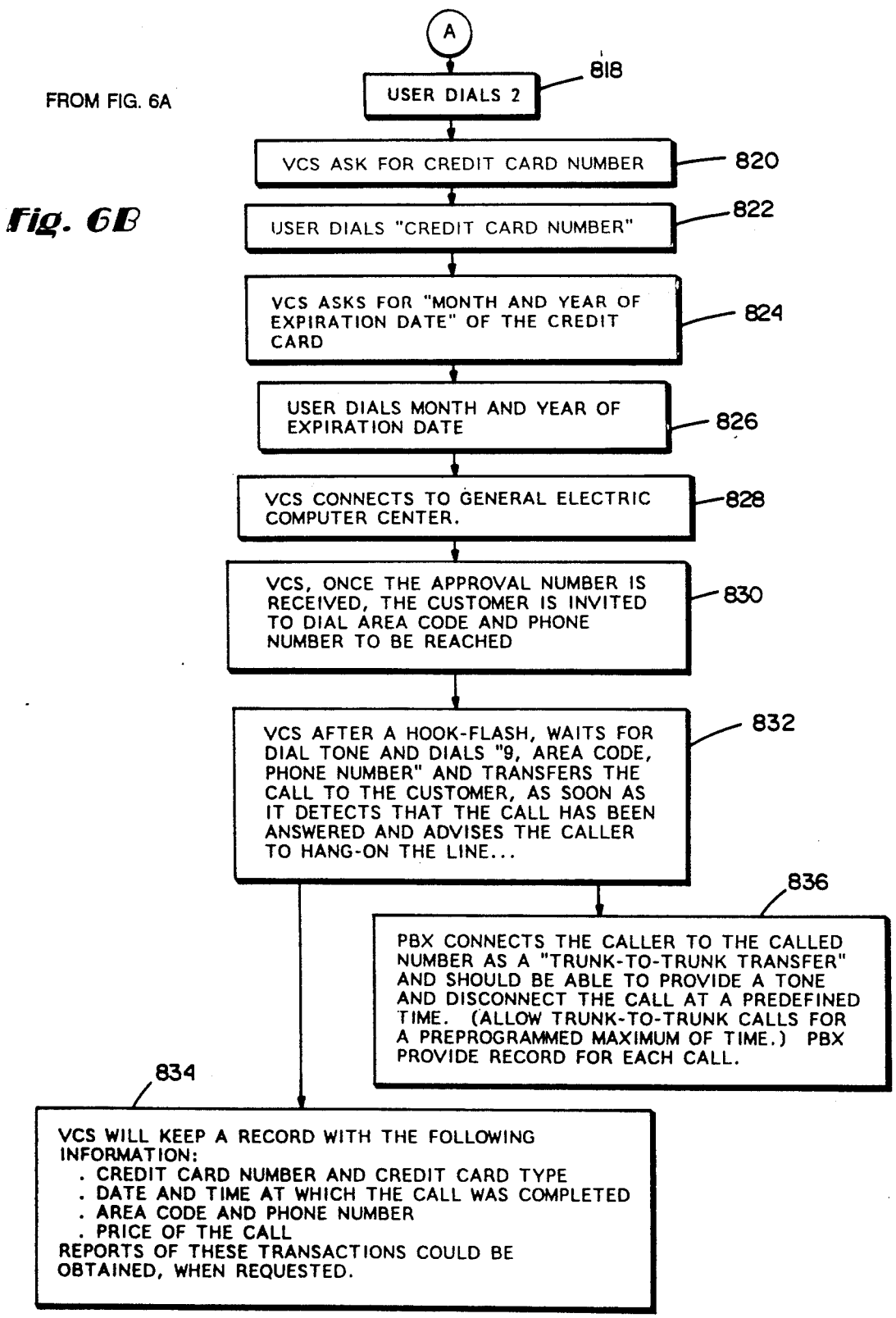

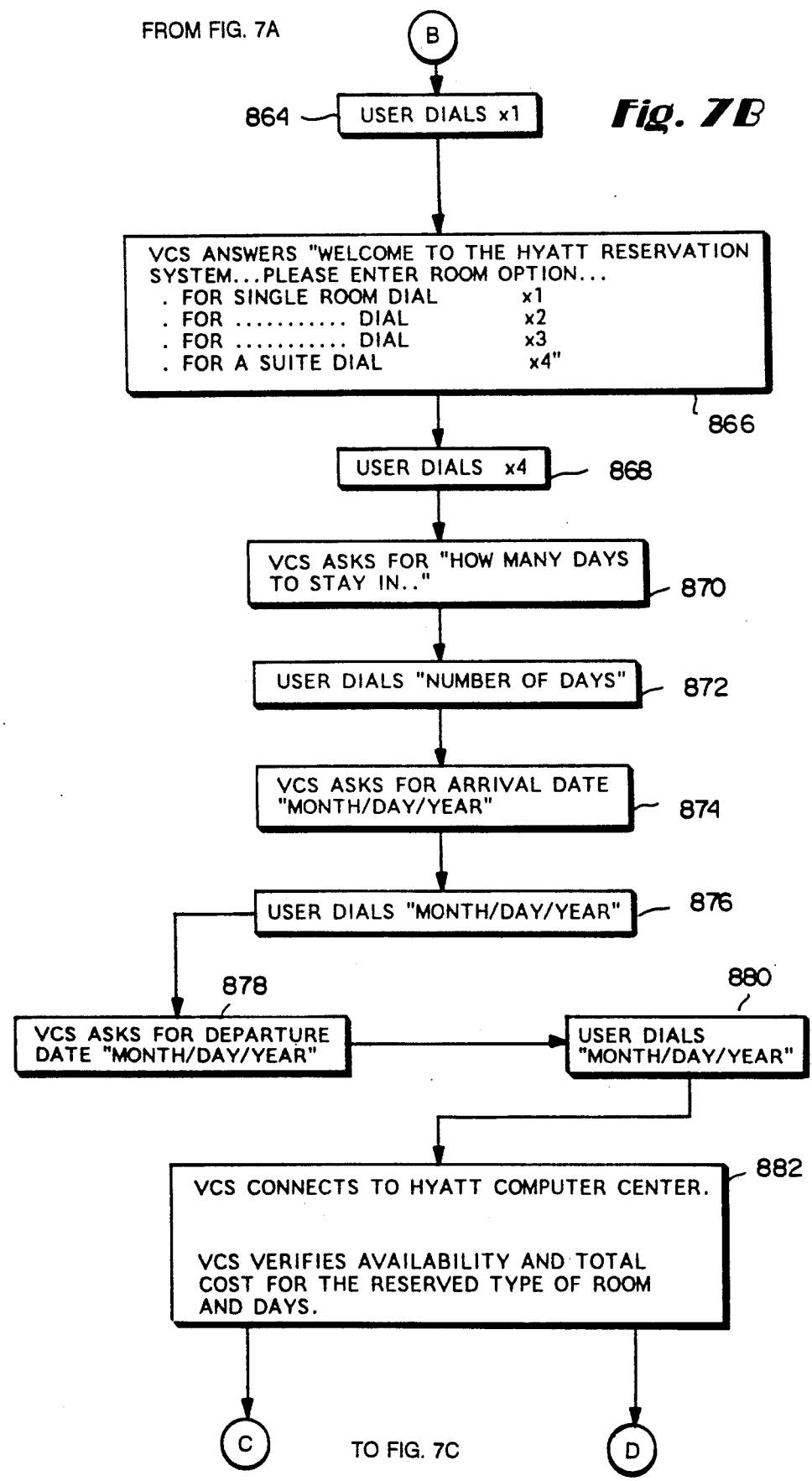

INTEGRATED VOICE-MAIL BASED VOICE AND INFORMATION PROCESSING SYSTEM

FIELD OF THE INVENTION

The present invention relates to telephone based voice mail and processing systems, and more particularly to integration of voice mail and processing systems with other services. Still more particularly, this invention relates to a system and method for economically providing advanced telephone call handling, voice mail, voice conversion and other services to many customers in a manner sufficiently flexible to fulfill the specific needs of individual users.

BACKGROUND AND SUMMARY OF THE INVENTION

So-called "Voice Mail Systems" (VMS) have finally found their way into widespread use. People have become accustomed to interacting with voice mail systems to obtain information such as railway schedules, performing arts schedule and ticket information, sports event scores and schedules, weather, etc. Many businesses and government agencies have installed voice mail systems to handle incoming calls, route the calls to appropriate extensions, allow callers to leave recorded messages, permit callees to access recorded messages easily and flexibly, and even provide intra-office and inter-office messaging capabilities.

Voice mail systems are commonly integrated with telephone switches (PBX) to provide what some term "an integrated solution" to telephone communications problems. By providing interaction between the voice mail system and the switch, the voice mail system can take advantage of the automatic call forwarding on no answer, message waiting light or alphanumeric displays, and other advanced PBX functions provided by the switch.

The VoiceMemo II manufactured by Centigram Inc. of San Jose, Calif. is an example of a modern day full-featured VMS. VoiceMemo II is a modular expandable 80286-microprocessor voice mail system including internal mass storage capabilities. Depression of TOUCH TONE keys of a telephone keypad control message delivery and retrieval, and voice prompts guide a caller through the various available functions. The system may be programmed to automatically call designated stations to deliver messages stored in electronic mailboxes. The system can also be programmed to page users in the field using conventional pager access techniques. Each user may record his or her own personalized greeting from any TOUCHTONE telephone, and such messages will be played to callers upon occurrence of selected events (e.g., for all incoming calls, for "ring no answer" situations, etc.). VoiceMemo II systems installed at different locations can be linked together over a modem-based high speed digital network to transfer messages to electronic mailboxes maintained in other locations. A "Receptionist II" option provides call screening, direct extension access and message taking functions—and allows incoming calls to be rerouted at the caller's selection (e.g., to a personal attendant, the call recipient's mailbox, or to a redial menu). The VoiceMemo II system can be integrated with a PBX (e.g., through a dedicated data link which allows the PBX to identify call origins to the VMS and allows the VMS to pass call waiting signals to the PBX, and via DTMF signalling over the talk path) to allow additional features and capabilities, such as using PBX call forwarding to direct calls to the VMS, and activating the PBX "message waiting" feature with the VMS. An "External Call Forwarding" interaction between the VMS and the PBX provides connection from the PBX's tie trunks to the VMS and allows calls to be forwarded to a trunk (i.e.,the VMS) instead of to a telephone station. With the VMS connected to the PBX trunks, calls will forward to the VMS and the PBX will dial the mailbox number. To transfer calls to an attendant, the VMS applies to the talk path a hook flash and then (after a brief pause) dials the attendant's extension and appends a "hang up" character. A direct trunk connection between the central office and the VMS allows different incoming telephone numbers to correspond to different mailbox owners using the telephone company "Direct Inward Dialing" (DID) features. Such DID capabilities can also be provided using Centrex or with PBXs having DID trunks.

So-called "Voice Conversion Systems" (VCS) are also now coming into widespread use. A voice conversion system is basically a database access system that permits a caller to access digital database information over the telephone by converting data (i.e., text) prestored by a computer into voice. Thus, a VCS may be regarded as a link between the digital world of computers and associated peripheral devices, and the analog(-/digitized analog) world of telephone calls. For example, local telephone companies can use voice conversion to provide electronic yellow page services over the telephone, better business bureaus may use voice conversion systems to provide automatic 24-hour-a-day information to callers about local businesses, stockbrokers use VCS to provide stock quotes over the telephone, etc. Other common applications of VCS include order entry and status inquiry, insurance claim status verification, service dispatch, and distribution of news stories. Voice conversion systems may also typically be integrated to a limited extent with a PBX so as to take advantage of the call transfer features the PBX provides, for example.

An example of a modern voice conversion system is the CallText Voice Gateway System marketed by Speech Plus Inc. of Sunnyvale, Calif. This VCS is an expandable modular 286-based processing system with each unit or node providing four simultaneously accessible lines each with full telephony capability, speech-to-text conversion, and stored (digitized) speech capability. Different modules can be networked together to provide up to 32 lines of simultaneous call processing. Each module can be configured to emulate a variety of different terminals and may thus be interfaced with any of several different types of host computers. Briefly, the system obtains text information for conversion to voice signals by emulating a host computer terminal and automatically providing keystrokes normally inputted by a human user to obtain display of desired information. The system then buffers desired portions of the displayed text and converts the buffered text into voice using speech synthesis techniques. The system has limited voice mail capabilities (e.g., through its stored digitized speech functions) and is also capable of initiating outgoing calls with full progress monitoring. The system also provides "call transfer capability using 'flash hook'". Physical separation of communications from voice ports allows access to different host computers (and even different types of host computers)—so that a single node can use different access techniques to access different hosts simultaneously.

A current trend in the industry is toward integrating voice processing and PBX functions into a single piece of equipment. For example, most voice conversion systems have limited voice mail capabilities (e.g., permit callers to record messages, produce voice from digitized prerecorded speech). At least some leaders in the industry are moving toward a full-featured integrated voice "voice processing" system that can provide all call handling tasks typically performed by individual VMS and VCS (and even PBX) units within a single piece of equipment. However, such systems will require extensive redesign of each of the system components and will therefore probably be quite expensive (and probably not cost effective for most users) for a long time to come.

The following is a (by no means exhaustive but at least somewhat representative) listing of prior issued patents and publications relevant to call processing systems:

U.S. Pat. No. 3,614,328 McNaughton;
U.S. Pat. No. 4,071,697 Bushnell et al;
U.S. Pat. No. 4,451,700 Kempner et al;
U.S. Pat. No. 4,554,418;
U.S. Pat. No. 4,367,548 Cotten, Jr. et al;
U.S. Pat. No. 4,612,416 Emerson et al;
U.S. Pat. No. 4,646,346 Emerson et al;
U.S. Pat. No. 4,790,003 Kepley et al;
U.S. Pat. No. 4,837,798 Cohen et al;
U.S. Pat. No. 4,700,378 Brown;
U.S. Pat. No. 4,734,931 Bourg et al;
U.S. Pat. No. 4,716,583 Groner et al;
U.S. Pat. No. 4,837,797 Freeny, Jr.;
U.S. Pat. No. 4,812,843 Champion, III et al;
U.S. Pat. No. 4,659,877 Dorsey et al;
Blount, "Talking Yellow Pages", *Target Marketing*, Vol. 10, No. 10, p. 40, October, 1987;
"Interactive Voice Information System" and other publications of Brite Voice Systems, Inc.
"Net Launches Enhanced Services With Uniform Interface", *Boc Week*, Vol. 6, No. 27, pp. 2-3, Jul. 17, 1989;
"Voice Processing: Defining Terms" and other articles in *Teleconnect*, pages 64-108 (April, 1989);
"The Gateway Connection", *Sky* pp. 56-63 (August, 1989);
"The Boom Has Begun" and other articles, *Teleconnect* pp. 61-119, 128-155 (April, 1988);
"Dytel Automated Attendant Exchange System Improves Productivity, Response to Incoming Calls and Operator Flexibility in the Office", *Caribbean Business* (Sep. 28, 1989);
Centigram sales literature dated August, 1989, including "Media Information", "Receptionist II", "VoiceMemo System Highlights—Release 5.0", "Mesa-Net", "VoiceMemo II", "Who Needs It . . . VoiceMemo II", and Application Notes "United Telephone of Florida . . ." and "Adding Voice Messaging . . . ", and pages 25-28, 39-42, and 75-76 of the VoiceMemo Installation and Maintenance Manual" published by Centrigram Corp. of San Jose, Calif.;
Centigram Media Information: "Centigram Corporation Announces VoiceMemo Software Release 5.01", San Diego, Calif. Sep. 26, 1989, 2pp.; "Nynex Selects Centigram's Voicememo II Voice Processing System for Central Office Use", San Jose, Calif. Sep. 11, 1989, 2pp.; "Centigram Communications Corporation , 8pp., March, 1990; "Corporate Highlights", March, 1990, 3pp.; and "Centigram Corporation and Voice-Tel Sign $15 Million Voice Messaging Network Agreement", San Jose, Calif., Feb. 2, 1990, 4pp.
"Voice-Tel Franchises Voice Memo Offers Nationwide Digital Network", Voice Memos, *News and Trends in Voice Messaging Technology and Products*, Vol. 1, No. 5, (January/February, 1990,) pp1-4; and
"Speech Plus, Inc. Corporate Highlights", "CallText Voice Gateway System", "CallText VGS", "CallText VGS/x", "CallText VGSdv", "Audio EMAIL", "Automated Toll Investigation System", "Audio Locator", "Audio Dispatch" publications of Speech Plus Inc. of Sunnyvale, Calif.

It appears that a current trend in the industry is toward a more integrated telephone user interface based on a voice mail system.

For example, the "Talking Yellow Pages" article cited above discloses an electronic yellow pages system in which a user dials a single number, uses his touch-tone keypad to select a category of inquiry, uses further keypad depressions to access a particular recorded advertisement, and then permits the user to make a selection and dial the number. Such a system (called CITY LINE) is supposedly actually in use in Wichita, Kans. and is operated by Brite Voice Systems, Inc.. The electronic yellow pages system also acts as a gateway to other information services (e.g., complete entertainment information, stock quotes, weather, astrological forecasts, and more). CITY LINE is allegedly completely supported by the advertisers and is therefore free to the caller. See also U.S. Pat. No. 3,614,328 disclosing another voice mail system.

The "Opportunity Calling" portion of the "Talking Yellow Pages" article discusses a hypothetical automated phone order merchandise catalog system (details regarding its implementation are not provided) in which "customers could dial your system and, using simple four-digit codes, ask for information, make orders and enter billing details—all automatically, without human operators. Should the customers want to talk to one of your operators, he simply dials *0 on his touch-tone phone and the operator's line would ring. At the end of the day, the computer provides a complete printout of the number of calls, which items were inquired about and which items were ordered, together with the total number of transactions and the dollar amount."

This phone order merchandise system is not disclosed as being integrated with the electronic yellow pages system but rather is described as a "stand-alone" system operated by an individual merchandiser.

New England Telephone announced in the Jul. 17, 1989 issue of BOC WEEK a new voice messaging system based on voice mail but having "follow on" services including "mail boxes" for individual subscribers, broadcast distribution of messages to various users' "mail boxes", and "paging notification" (pagers are called automatically after a message is deposited to alert users that a message is in their mailbox).

U.S. Pat. No. 4,790,003 to Kepley et al (AT&T) teaches a technique for networking different voice mail systems together with a wideband data file transmission facility and associated protocol provided by the telephone exchange.

U.S. Pat. No. 4,837,798 to Cohen et al (AT&T) teaches a unified messaging system where different types of messages (voice mail, electronic mail, etc.) can be handled through a common system.

U.S. Pat. Nos. 4,612,416 and 4,646,346 to Emerson et al (and assigned to AT&T) teach an integrated message service system based on voice mail which provides users with improved notification that the system is storing messages for them that they have not yet retrieved.

U.S. Pat. No. 4,734,931 to Bourg et al teaches an integrated calling directory system.

U.S. Pat. No. 4,071,697 to Bushnell et al relates to an interactive video/telephone transmission system in which a television signal distribution system provides text for display on a television. The user selects from the displayed text options using a terminal connected to a telephone line. The selection information is communicated via the telephone exchange directly to merchants—thus allowing the user to place orders or request information.

See also U.S. Pat. No. 4,700,378 which discloses a system for accessing database information over telephone lines without the need for a television signal distribution system.

U.S. Pat. No. 4,451,700 to Kempner et al teaches an telephone based automatic audience survey system providing voice messaging and automatic user selection via a data terminal.

U.S. Pat. No. 4,554,418 to Toy teaches a telephone-based information access system permitting users to specify events (e.g., a stock price) in advance. When the event occurs, the system automatically establishes telephone contact with the user and provides a synthesized voice message regarding the event.

U.S. Pat. No. 4,367,548 to Cotten, Jr. et al teaches a fiber-optics based integrated services link for providing various telephone and other services to telephone subscribers.

The Centigram publications describe an exemplary state-of-the-art Voice Mail system. The Speech Plus publication describe a state-of-the-art voice conversion "gateway" system. The *Teleconnect* articles cited above survey currently commercially available call processing technologies.

It is thus generally known to use voice mail systems to provide users with voice menus of callee choices, accept caller selections, etc. It is also known to use a voice mail system to provide various types of information (e.g., weather, stock market quotes, etc.) along with electronic yellow page and other directory information. It is also known to network different geographically separated voice mail systems using a high-speed data network. It is known to provide prerecorded advertising via a voice mail system (and to permit advertisers to change their advertisements by simply recording a new advertisement over the telephone). It is known to use a terminal connected to both a telephone network and to a television signal distribution network to allow a user to place orders directly to merchandisers. And it is also known to integrate paging services to some extent with a voice mail system.

However, even though much work has been done in this area in the past, further improvements are still possible.

One of the problems with voice processing technology is that it is prohibitively expensive for a large majority of prospective users. Typical full-featured Voice Mail Systems can cost in excess of $200,000, and typical full-featured Voice Conversion Systems cost in the range of $100,000 or more. Such systems are economically feasible only for large businesses or other organizations and are priced completely out of the reach of small businesses and individuals. While advances in personal computer technology have made it possible to provide Voice Mail capabilities using inexpensive personal computers, such systems have relatively limited capabilities and features and may still be too expensive (and not cost effective) for many users who could truly benefit from voice processing.

Moreover, even the expensive full-featured systems suffer from certain disadvantages. For example, a big problem associated with Voice Mail systems is the limited number of ports they provide. Typical full-featured Voice Mail systems are capable of routing calls they receive to another location. However, since this call routing capability routes the call through the VMS, one such routed call typically occupies two ports of many VMS systems: one port is connected to the incoming call which is then routed through the VMS to another port used for "outputting" the call to the routed destination. Increasing the number of VMS ports is expensive, but often the only alternative is to lose the ability to timely service all incoming calls during peak traffic periods.

The present invention provides an innovative "one-stop" full service telephone call/communications handling system combining voice mail, voice recognition, database handling and networking features into an integrated system that is highly cost effective for even small organization and individual users.

A voice mail system is programmed to automatically answer incoming telephone calls from a variety of incoming sources, and offers callers different options depending upon the number they call in on. Some incoming telephone lines are dedicated to particular services or types of callers, while other incoming lines provide a more general public interface for a variety of services offered by the system.

Unlike prior voice mail systems (which typically simply answered the telephone and provided a single application-specific function, e.g., providing train schedules or ticket information or routing calls to specific extensions within a company), the system of the present invention provides a more generalized interface offering callers a variety of different functions/operations/capabilities, including the following examples:

(a) electronic yellow pages/directory assistance integrated with a database access (VCS) system and a call routing (PBX) system to provide a caller with a voice menu (and sub-menus) of callee choices, accept caller selections, initiate requested telephone connections with desired callees, and if no connection is made, reactivate the voice mail system to allow the caller to leave a message for later playback by the callee;

(b) integrated database handling/voice conversion with voice mail functions to provide various different types of information to callers (depending upon caller need) and, if necessary, to access databases within remote customer computers to provide required information;

(c) integrated voice mail with customer PBX systems so that the voice mail can initiate a telephone call within a customer's remote PBX via a "tie line" (or other known network) into the customer's own switch;

(d) certain ports on the voice mail system are dedicated for networking information with other, geographically separated voice mail systems to provide an integrated world-wide network of voice mail system sharing a distributed database—preferably including satellite links which can also support routing of long distance calls (for example, so that a businessman in Hong Kong can leave a voice mail message via a local call and that voice mail message is automatically transferred back to his home office voice mail handling system);

(e) advertising distribution via telephone (e.g., from digitally prerecorded messages stored in a database) with provision for placing orders (accepted electronically via the voice mail system and recorded directly on the advertiser's computer system) or routing the call automatically to a human merchandiser at the advertiser's place of business;

(f) tie in through cable television system so the cable television channel selector can act as a terminal and the television can be used to display menu/choice options (or so that a personal computer can be linked to the system via the cable television lines);

(g) a dual tone "multifrequencer" front end interface that translates pulse dial type signals into DTMF touch-tone type signals;

(h) providing generalized database and/or services accesses via voice mail on a variety of subjects selected by the user via prompted keypad selections and/or spoken voice prompts, and providing multiple such accesses in response to a single telephone call (e.g., so the system can route a traveller first to an airline reservation system, then to a hotel reservation system, and then to a car rental reservation system); and (i) paging system integrated with voice mail system.

The present invention thus provides a degree of integration not available in prior art voice processing systems. For example, in accordance with one aspect of the present invention a centralized voice mail system includes direct "tie lines" to a plurality of clients and associated system support facilities to selectively route incoming voice mail calls directly to individuals via a client internal PBX system and/or to electronically instantly transmit merchandise or service orders handled via the voice mail system directly to the client's data processing system. The preferred embodiment system is also capable of directly routing a call to a specific client telephone number after calling a generalized electronic yellow pages information number. In the preferred embodiment of this invention, any standard telephone set is effectively transformed into a remote terminal capable of accessing an extremely powerful integrated central resource.

The present invention also provides a unique architecture that obtains advantages by maintaining VMS, VCS and PBX systems as totally separate entities. For example, in accordance with one feature of the present invention the VMS and the VCS each actually release calls to the PBX for routing elsewhere. Thus, even though the VMS and VCS may provide internal call routing features, those features are not used because they tend to tie up valuable VMS or VCS ports. Instead, if a call being handled by the VMS for example is to be routed elsewhere, the VMS issues a "hook flash" signal to the PBX and then uses the PBX call routing capabilities to forward the call to another destination. The effect of this call routing process is to release the VMS port for use by another caller requiring voice mail service—thereby much more efficiently utilizing the resources of the VMS while also taking advantage of the more advance call routing functions the PBX is designed to provide.

Moreover, an important advantage provided by the present invention is the ability to economically provide voice processing and call handling to small businesses, individuals and the general public. Unlike most typical call processing systems which are dedicated in application to handle the calls of a particular business, the preferred embodiment system provides many different services to many different users. A retailer may use the system to take orders which are then electronically transferred to the business' own internal computer system. A service organization, on the other hand, may use the voice mail features of the system to answer calls forwarded on no answer and to advertise. The general public can call the system to receive a directory of services and goods, to hear advertisements, and to then actually place orders if desired. A single incoming call can be involved in an number of different transactions (e.g., make airline reservations, make hotel and car rental arrangements, find out the weather in the travel destination, etc.). Such great flexibility and functionality has simply not been provided by any system in the past.

BRIEF DESCRIPTION OF THE DRAWINGS

These and other features and advantages of the present invention will be better and more completely understood by studying the following detailed description of presently preferred exemplary embodiments in conjunction with the FIGURES, of which:

FIGS. 6A-11B are schematic flow charts of exemplary application and specific program control steps performed by the FIG. 1 system.

DETAILED DESCRIPTION OF THE DRAWINGS

Figure 1:
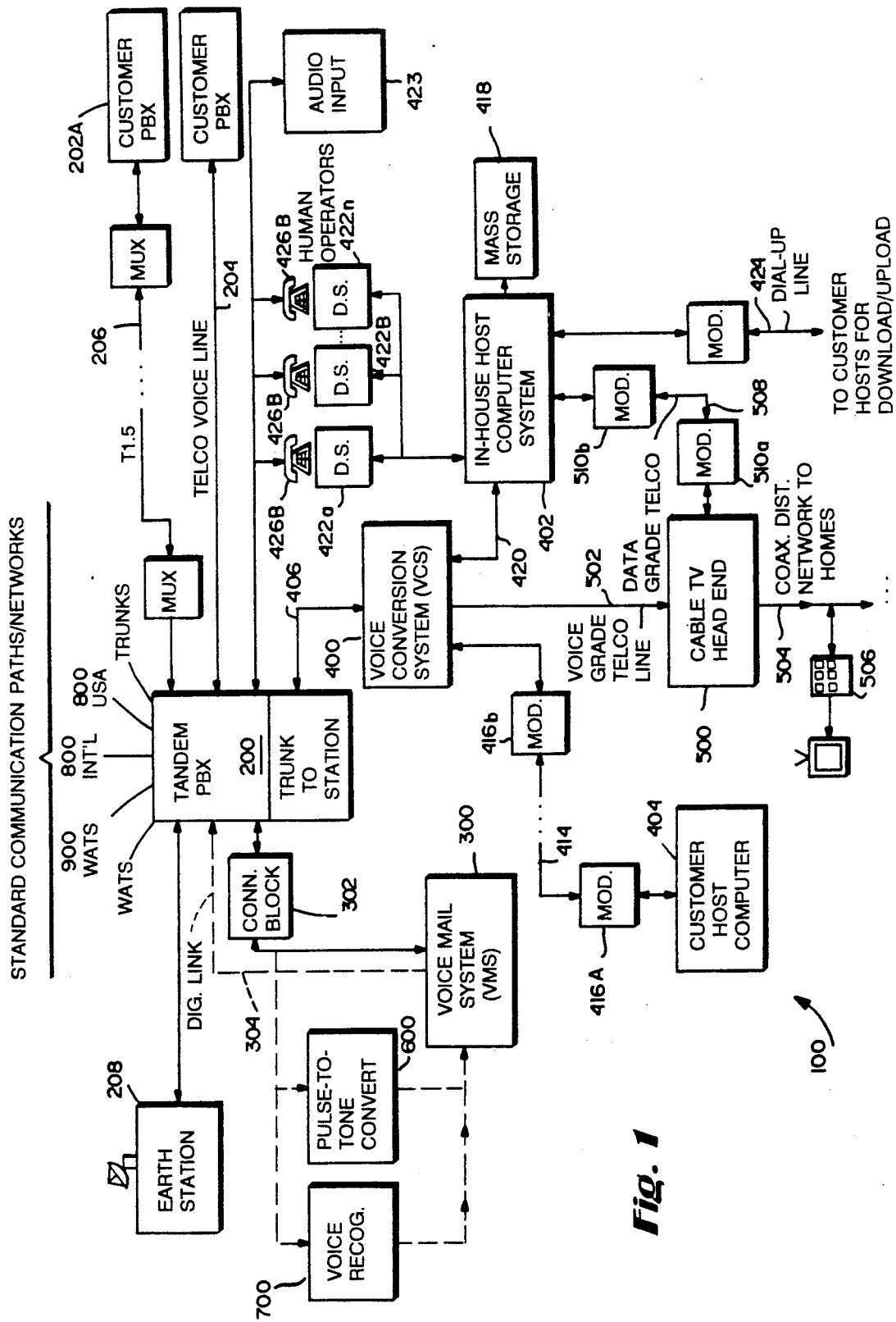
FIG. 1 is a schematic block diagram of the presently preferred exemplary embodiment of a voice and call processing system in accordance with the present invention.

FIG. 1 is a schematic block diagram of the presently preferred exemplary embodiment of an information handling and providing system 100 (hereafter "the system 100") in accordance with the present invention.

System 100 includes a digital telephone switch (PBX) 200, a voice mail system 300 (hereafter "VMS 300"), and a digital voice conversion system 400 (hereafter "VCS 400"). In the preferred embodiment, each of these components 200, 300, 400 comprises conventional, off-the-shelf equipment that has been custom programmed for use in system 100.

Even though VMS 300 and VCS 400 may each provide certain limited call routing PBX functions, those limited PBX functions are not generally used within system 100. Instead, PBX 200 performs virtually all call routing functions in the preferred embodiment of system 100. VMS 300 provides voice mail type functions (e.g., automatic call answering, generation of audible prompts requesting responses from callers, mailbox and other message storage and handling functions, and the like). VSC 400 provides a facility to convert digital data (e.g., text) into voice signals. Each of VMS 300 and VCS 400 also has the capability of cooperating and interacting with PBX 200 in a very efficient manner that will be explained shortly.

Briefly, in the preferred embodiment PBX 200 is responsible for routing incoming calls to VMS 300 and/or to VCS 400 (and may also route calls to other destinations and devices as will be explained shortly). In the preferred embodiment, PBX is a conventional off-the-shelf digital telephone switch (e.g., model no. SL1 Meridian I manufactured by Northern Telecom). PBX 200 has digital signal handling capabilities and can connect directly to incoming and outgoing trunk lines, T1 multiplexed telephone lines, and tie lines to other (e.g., customer) PBX's. PBX 200 should have sufficient call handling capacity (e.g., tens of hundreds of ports) to handle a large number of incoming calls at once, and preferably is capable of handling voice and data communications simultaneously.

PBX 200 in the preferred embodiment is connected to several different telephone paths so as to receive incoming calls and generate outgoing calls on a wide variety of different types of telephone networks. By way of non-limiting example, PBX 200 may be connected to public long distance carrier ("interlata") networks (e.g., MCI, U.S. Sprint), several trunk/network lines provided by the local/regional telephone company ("Telco") public telephone network ("intralata"), a "900" number telephone network, 800 International and national (e.g., USA) networks, one or more other WATS ("wide area telephone service") networks, etc. Any or all such standard communications paths/links/networks may be used by PBX 200 for receiving incoming calls and/or for placing outgoing calls.

PBX 200 is preferably connected to a variety of different local Telco incoming trunk lines having preassigned telephone numbers assigned thereto. Preferably, some of these telephone numbers are assigned according to mnemonics associated with particular applications (e.g., 775-INFO for a main information number, 543-BANK for home banking applications, etc.). PBX 200 is connected to a sufficiently large number of such incoming trunk lines so as to provide unique telephone numbers for each of many different applications.

PBX 200 is also, in the preferred embodiment, connected directly to customer site PBX's 202 so as to allow system PBX 200 to receive calls (voice or data) directly from such customer sites and route calls directly to such customer sites without the need for routing through any of the public or other telephone networks mentioned above. The nature of the connection between PBX 200 a customer PBX generally depends upon the requirements of the customer and upon the amount of call traffic that must be handled by the connection. For customers requiring only light traffic handling capabilities, one or several Telco dedicated (e.g., two-pair) voice channels 204 may couple the customer PBX 202B to system PBX 200. Other customers may wish to provide a so-called "tie line" (not shown) which may be used to connect PBX 200 directly to a customer PBX so as to provide additional functionality (e.g., the ability of PBX 200 to reach a customer station by dialing an extension number). If more traffic handling capacity must be provided, then one or more standard T1 multiplexed communication links 206 (either cable based or microwave) may be used to provide many (e.g., 24 or more) simultaneous voice and data channels between system PBX 200 and a customer PBX.

PBX 200 is also coupled to an "on premise" earth station 208 (e.g., an AT&T "Skynet") which connects system 100 to a network of other such systems. Further discussion of such network connections will be presented shortly.

PBX 200 in the preferred embodiment provides standard and advanced PBX functions such as trunk-to-station connections, automatic call distribution, and the like. As is well known, the "trunk to station" portion of PBX 200 provides automatic call answering of incoming calls and automatic connection of such incoming calls to "ports" of destination devices (e.g., VMS 300 or VCS 400). For example, suppose the telephone number 775-INFO was preassigned to correspond to a general public electronic yellow pages number. When a caller dials this number, PBX 200 may automatically route the incoming call to a predetermined port of VMS 300. Similarly, calls coming in on other predetermined incoming trunks may be automatically routed by PBX 200 to ports of VCS 400 or to ports of other destination devices using trunk-to-station routing techniques.

PBX 200 also, as mentioned above, includes conventional "automatic call distribution" (ACD) capabilities. As is well known, ACD provides more versatile and flexible call routing. For example, the ACD feature of PBX 200 may automatically re-route a call on an incoming trunk preassigned by the "trunk-to-station" portion of PBX 200 to a "busy" (i.e., in use) destination device port—or the ACD may instead place the incoming call "on hold" or provide prerecorded voice prompts (e.g., via VMS 300 if desired) allowing the caller to select what action he wishes the PBX to take (e.g., place him on hold, route to the VMS 300, etc.). The PBX 200 ACD functionality and characteristics may be flexibly programmed in a well known manner by loading customized program control steps into the PBX.

VMS 300 in the preferred embodiment comprises a standard voice mail handling system (e.g., a Voice Mail System Version 5.0 manufactured by Centigram) including a digital processor and mass storage. In the preferred embodiment, 32 ports of simultaneous voice mail handling capabilities are provided by VMS 300. Connections between PBX 200 and VMS 300 are made in the preferred embodiment by connecting PBX station ports to a telephone connection block 302 (e.g., using standard 4-wire channel local circuits), connecting VMS 300 ports to an adjacent telephone connection block, and then connecting jumpers between the two blocks. The positions of the interconnecting jumpers may be changed as desired so as to allocate different ports of VMS 300 to different station ports of PBX 200.

VMS 300 is preprogrammed in the preferred embodiment to provide different voice mail functions depending upon the input port the call is routed to. In addition, VMS 300 may provide any of various different prompts through the same input port depending upon digits (or other tone or digital encoded information) passed to it by PBX 200. An optional digital link 304 may be provided to provide a digital communications path between PBX 200 and VMS 300. In the preferred embodiment, there is correspondence between the incoming trunk of PBX 200 on which a caller appears and the prompts/functions presented by VMS 300 to that caller. This correspondence may result from trunk-to-station routing functions of the PBX 200 in some incoming call situations, or it may result from additional control over VMS 300 provided by the ACD portion of the PBX.

Generally, predefined general purpose prompts are generated by VMS 300 for calls connected to the VMS input ports allocated to trunk-to-station PBX call routing. For example, any of several general information incoming trunks may always be routed by PBX 200 to certain ports of VMS 300—and the VMS will generally always present the same "standard" or "general" voice mail prompts to such incoming calls (e.g., "Good Afternoon. You have reached the INFOGUIA INFOGATE system . . . ").

The preferred embodiment includes an audio input system 423 for inputting high quality audio into system 100 (e.g., for storage by VMS 300). Typically, a user may record a new voice mail prompt by picking up a standard telephone, dialing an appropriate sequence of TOUCH TONE (or pulse) codes, and then speak the prompt into the telephone. While this technique of recording voice prompts is convenient, it suffers from certain disadvantages—including poor voice quality. Typical telephones have only carbon microphones exhibiting poor frequency response, causing the recorded voice mail prompt to sound like it was recorded over the telephone (rather than having the quality one would obtain if a "live" person was at the "other end" of the call). In addition, it is impractical to record sound effects or music using this technique. Some advertisers have access to sophisticated audio production and recording equipment (e.g., for producing radio and television advertisements) and might like to use those same techniques for providing voice mail prompts to be delivered by VMS 300.

Audio input block 423 shown in FIG. 1 is connected to PBX 200 as a local telephone station in the preferred embodiment. The function of audio input block 423 is to input high quality prerecorded storage by VMS 300 or VCS 400).

Figure 1A:
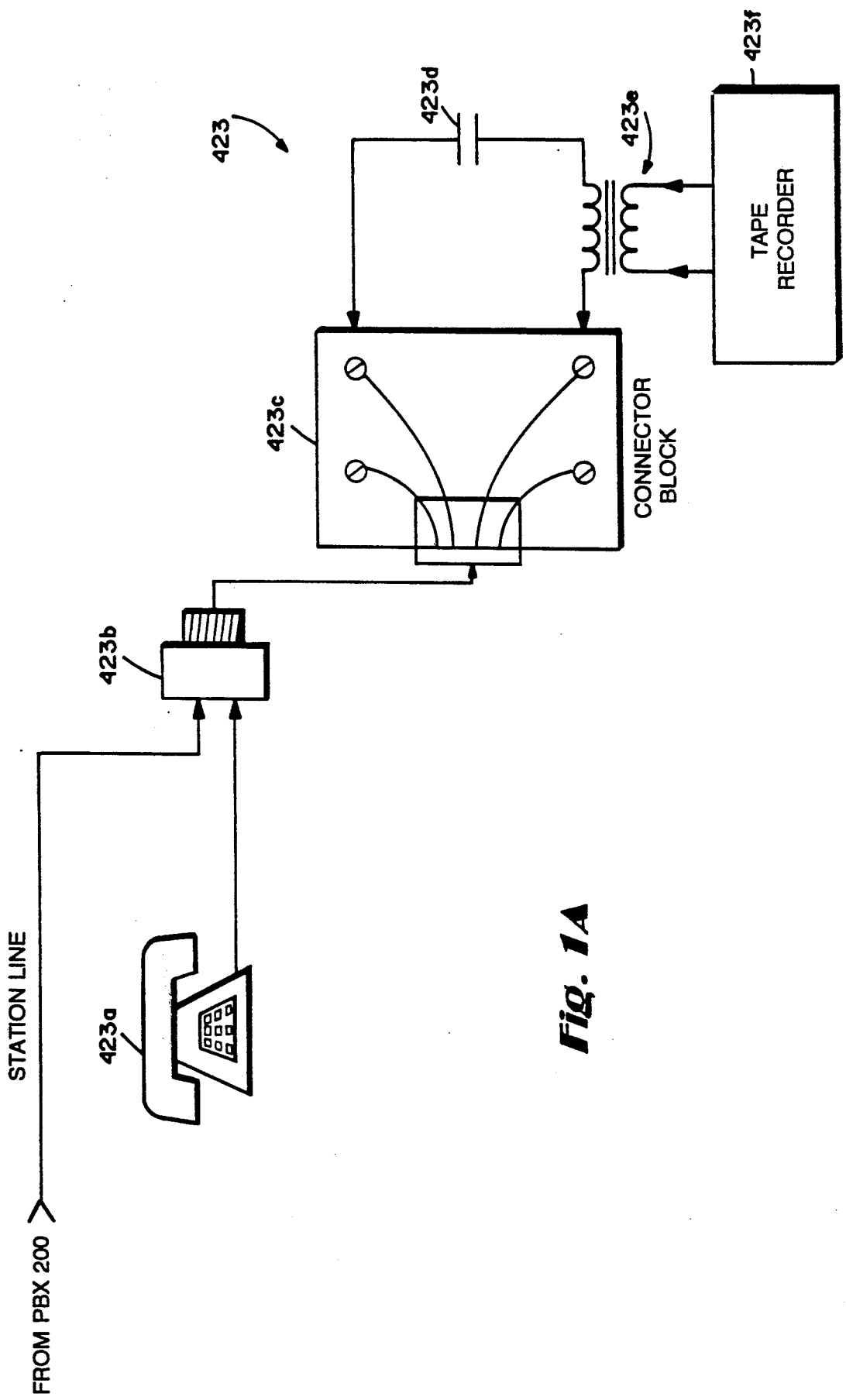
FIG. 1A is a schematic diagram of an exemplary audio clock of the preferred embodiment.

FIG. 1A is a detailed schematic diagram of audio input block 423. Audio input block 423 includes a standard telephone set 423a (for dialing purposes), a standard RJ11 "splitter" 423b, a connector block 423c, an electrolytic capacitor 423d, a 600 Ohm isolation transformer 423e, and a tape recorder/player 423f. Splitter 423b is connected to a station (e.g., DID) line provided by PBX 200, and connects that station line to both telephone set 423a and to connector block 423c. Telephone set 423a (which may be a speaker phone) is used to dial VMS 300 via PBX 200. Preferably, the mute of telephone set 423a is ON to prevent room noise picked up from the telephone set from also being recorded by VMS 300.

Connector block 423c connects the DID line to the secondary winding of audio isolation transformer 423e through a high value (e.g., 10 microfarad) series capacitor 423d. Capacitor 423d provides blocking of DC currents. Transformer 423e is preferably a conventional 600 Ohm to 600 Ohm isolation transformer exhibiting good frequency response, and serves to protect the output stage of tape recorder 423f from the voltage levels existing on the telephone line. As will be understood, the polarity of the transformer 423e primary winding with respect to the tip and ring connections of connector block 423e is not critical.

Tape recorder 423f may be any standard audio tape recorder capable of playing audio tapes prepared on or off site (e.g., in a client's recording studio).

To use audio input block 423 to record high quality audio prompts on VMS 300, a user dials the VMS with telephone set 423a and then input appropriate additional dial signals to place the VMS in a prompt recording mode (all in a conventional manner). The user then sets the "volume" output level of tape recorder 423f to an appropriate level and starts the tape recorder to play a prerecorded audio prompt starting at the beginning. The audio output provided by tape recorder 423f passes through transformer 423e and capacitor 423d with no loss of quality, and is coupled to the VMS 300 via connector block 423c, splitter 423b and PBX 200. Since the output of tape recorder 423f preferably provides very high quality output, the only limitations on the quality (e.g., frequency response) of the audio prompt stored by VMS 300 are those bandwidth limitations imposed by VMS 300 and PBX 200.

The ACD functional portion of PBX 200 also is capable of routing calls to VMS 300, and may route calls to different input ports of the VMS depending upon the nature of the call and the particular application involved. The ACD functionality of PBX 200 is preprogrammed to generate one or more further dialing digits upon successfully routing a call to a VMS 300 port—with the digits specifying the nature of the prompts and/or other voice mail functions that the VMS is to present to that specific caller. VMS 300 provides a standard feature that allows an incoming caller to select options based on TOUCHTONE or pulse digits the caller dials. VMS 300 is designed to expect the caller to dial those digits and generally provides different voice mail functions to the caller depending upon the digits dialed by the caller. In the preferred embodiment, the ACD of PBX 200 automatically dials a prefix digit or digits immediately upon connecting a new call to VMS 300—thus requesting a subset of VMS functions in a manner that is entirely transparent to the caller. By providing this interaction between PBX 200 and VMS 300, system 100 takes advantage of standard features of the VMS to provide additional functionality not previously provided by either the PBX or the VMS alone.

For example, PBX 200 may be connected to an incoming trunk dedicated for use by a particular small business. If calls coming in on that incoming trunk are to be routed to VMS 300 (as opposed to the internal PBX of the business, for example), the PBX ACD may route the call to any available input port of VMS 300 and then generate a predetermined digit or sequence of digits (e.g., "38") corresponding to that particular business. VMS 300 is preprogrammed beforehand to recognize that digit or sequence of digits as corresponding to that business and generates in response customized voice mail prompts corresponding to that business. For example, an introductory prompt generated by VMS 300 may greet the call with the name of the business (e.g., "Good morning. You have reached the Acme Manufacturing Company voice mail system . . .) and then present the caller with further voice mail prompts customized for that particular business (e.g., a directory of personnel, an ability to leave a message in a voice mail "mailbox" corresponding to that business, etc.). Since such prompts are customized for the business or other application, the caller may never be aware of the fact that he has reached an external call handling service but may instead believe he has reached an internal voice mail system within the business. This has great advantages, since the business' "telephone image" is preserved (and can actually be specified and customized by the business) even though the business has not purchased its own voice mail system but is instead in a sense "time sharing" system 100.

After the VMS 300 input port is subsequently released (e.g., upon call termination), the PBX 200 ACD may route another incoming call coming in on a different trunk to the same VMS input port—but once the VMS port has been connected the PBX ACD may generate a different digit or digit sequence to control the VMS to present an entirely different set of prompts/functions to the caller corresponding to that different PBX incoming trunk.

In a preferred embodiment, the so-called "hook flash" voice line control signal is used by VMS 300 so as to transfer calls from the VMS to some other portion of system 100. In at least some prior art voice mail systems designs, call transfer from the VMS was effected using "external call forwarding". Using "external call forwarding", the VMS would receive a call on one port, determine (e.g., based on touch tone signals inputted by the caller) what destination the call was to be routed to, initiate a new outgoing call on another port so as to connect to that desired destination, and then internally connect the ports together. As discussed above, this "external call forwarding" arrangement is highly disadvantageous because of the limited number of ports provided by typical voice mail systems. In accordance with the preferred embodiment of the present invention, VMS 300 does not use "external call forwarding" to reroute calls. Instead, once VMS 300 ascertains a destination to which the call is to be routed, the VMS outputs a "hook flash" signal onto the same voice line "port" the call is coming in on. PBX 200 responds to this "hook flash" signal by providing PBX dial tone to VMS 300. VMS 300 then generates dialing signals in response to the PBX TONE and, finally, generates a "hang-up" signal. The result of this voice line control signal interchange is to control PBX 200 to reroute the call from the VMS 300 port to the destination specified by the VMS—thereby liberating the VMS port for use by another incoming call. This technique of call routing takes advantage of the call routing functions designed into PBX 200 and also maximizes the use of VMS ports.

VCS 400 in the preferred embodiment may comprise a CallText Voice Gateway System manufactured by Speech Plus, Inc. One principal function of VCS 400 in the preferred embodiment is to convert textual database information stored in digital form (e.g., by an in-house host computer system 402 or by a customer host computer 404) into voice signals for application to a voice line. VCS 400 may be connected to PBX 200 via a conventional local circuit 4-wire channel link 406 or other suitable connection. PBX 200 may route calls to ports of VCS 400. Different VCS 400 ports may provide different functions (i.e., certain ports may be dedicated for certain specific applications) —or PBX 200 may provide additional information over the voice line (or possibly over an additional digital link not shown connecting the PBX with VCS 400) specifying which VCS application is to be presented to the caller.

In the preferred embodiment, VCS 400 is custom programmed (using conventional programming techniques) to provide synthesized voice prompts upon receipt of a call, these voice prompts soliciting information from the caller. For example, for some applications (e.g., access to confidential databases) VCS 400 may first request the caller to dial in a confidential password or other access code in response to which the VCS may grant the caller access to the desired information (e.g., PIN code). Different audio selection menus may be presented to callers depending upon which incoming line the caller came in on or other factors (e.g., from which VMS 300 application the call was transferred). VCS 400 may then access an appropriate database within an appropriate host computer in order to obtain database information (in text form), convert this database information into synthesized speech, and present the synthesized speech to the caller.

Figure 2:
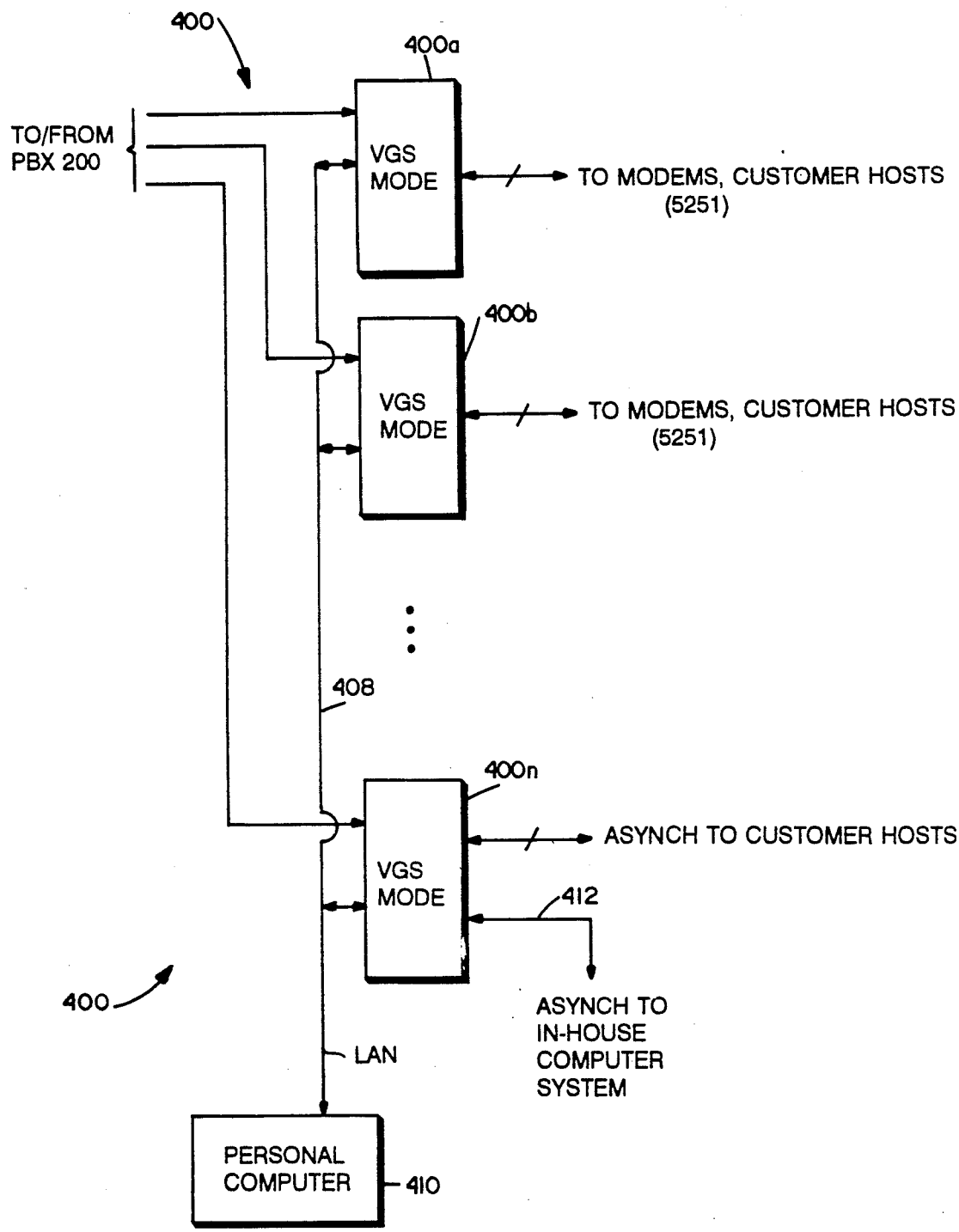
FIG. 2 is a schematic block diagram of an exemplary voice conversion system architecture that may be used for the VCS shown in FIG. 1.

FIG. 2 is a detailed block diagram of an exemplary VCS 400 architecture based upon the Speech Plus VGS system. In the preferred embodiment, VCS 400 may include a plurality of Speech Plus VGS nodes 400a–400n (generally up to eight nodes may be used to provide 32 ports). VGS nodes 400a–400n may be connected together via a local area network 408 to which may also be connected a personal computer or other similar processor 410. Personal computer 410 may be used to monitor the operation of VCS 400 and also to perform custom programming functions in a conventional manner. In the preferred embodiment, different types of host computers are accommodated by different VGS nodes 400a–400n. For example, VGS node 400a may be programmed or otherwise equipped to provide 5251 terminal emulation (and thus may be used to access an IBM mini-computer host such as system 36s, system 38s and AS400s). At least one VGS node 400n in the preferred embodiment provides asynchronous communications to communicate with asynchronous customer host (e.g., personal computers). A dedicated link 410 between VGS node 400n and inhouse host computer system 402 (which in the preferred embodiment is a multitasking personal computer type processor based on the 8386 microprocessor) provides communication between VCS 400 and the inhouse host computer system. In addition to being hardware-equipped to emulate appropriate terminals, VCS 400 is custom programmed to provide host keystroke access sequences to obtain desired information.

As one example, suppose a customer involved in the shipping industry wanted to provide, through system 100, an ability to check the status of various shipments by telephone. Suppose this customer maintained a database on its IBM AS/400 minicomputer (including appropriate application programming) that permitted a local display station user to display various information in response to certain inputted key strokes. VCS 400 in the preferred embodiment may be programmed to provide automatically those same key strokes (as well as to access the customer's host computer 404 via dial-up or dedicated telephone company lines 414 and associated modems 416)—thus providing an automated display session which extracts desired information from the customer host computer. These automated key strokes provided by VCS 400 to customer host computer 404 may be altered by TOUCH TONE key strokes inputted by a caller (e.g., so that the caller can specify a specific data record to access, specify "next screen" or "previous screen" type scrolling, etc. In this way, VCS 400 in combination with application programs executing on customer host computer 404 together provide a sophisticated interface to a caller. More information regarding one exemplary voice conversion system may be found in the above-cited Speech Plus publications.

Referring once again to FIG. 1, in-house host computer system 402 (as mentioned previously) may in the preferred embodiment include a multitasking personal computer preferably having substantial amounts of local mass storage 418. Task host computer system 402 maintains several local data bases on mass storage 418, including, in the preferred embodiment, electronic yellow pages listings and "want ad" type advertisements—but also maintains much other information (as will be explained shortly). VCS 400 is capable of selectively accessing the databases maintained by in-house host computer system 402 over a local circuit 420. The databases maintained by in-house host computer system 402 on mass storage device 418 may be inputted via local display stations 422, or they may be obtained by downloading over dial-up or dedicated lies 424 from customer sites.

Local display stations 422 may also be used by human operators to view database information during "attended call handling" via telephone sets 426 (these telephone sets 426 are connected to PBX 200 and provide a means by which callers without TOUCHTONE telephones or callers requiring special assistance may reach a human operator).

In the preferred embodiment, system 100 also interfaces to a cable television head end 500. VCS 400 may provide converted voice signals over voice grade telephone line 502 for broadcast over the cable television network 504. The cable television head end 500 may gather digital information transmitted by individual users via depression of buttons on their cable television converter box 506 (i.e., thus permitting the cable television converter to be used as a remote digital terminal), and to provide those digital signals to in-house computer system 402 via a data grade telephone line in 508 and associated high-speed modems 510. This analog/digital interface with a cable television system provides additional flexibility and applications (e.g., making it practical to provide home shopping and other features from user homes).

An optional pulse-to-tone converter 600 may be provided as part of system 100 to convert rotary telephone set pulse-type dialing sequences into TOUCHTONE type DTMF tones for appropriate interfaces with VMS 300, VCS 400, etc. An optional voice recognition system may also be provided for converting spoken commands into control signals for controlling VMS 300 VCS 400 and PBX 200.

Now that the overall architecture of system 100 has been described, exemplary signal processing steps performed under program control by the preferred embodiment of system 100 will be described first in terms of the generic steps shown in FIGS. 3–5 and then by way of the application-specific steps shown in FIGS. 6A–11.

Figure 3:
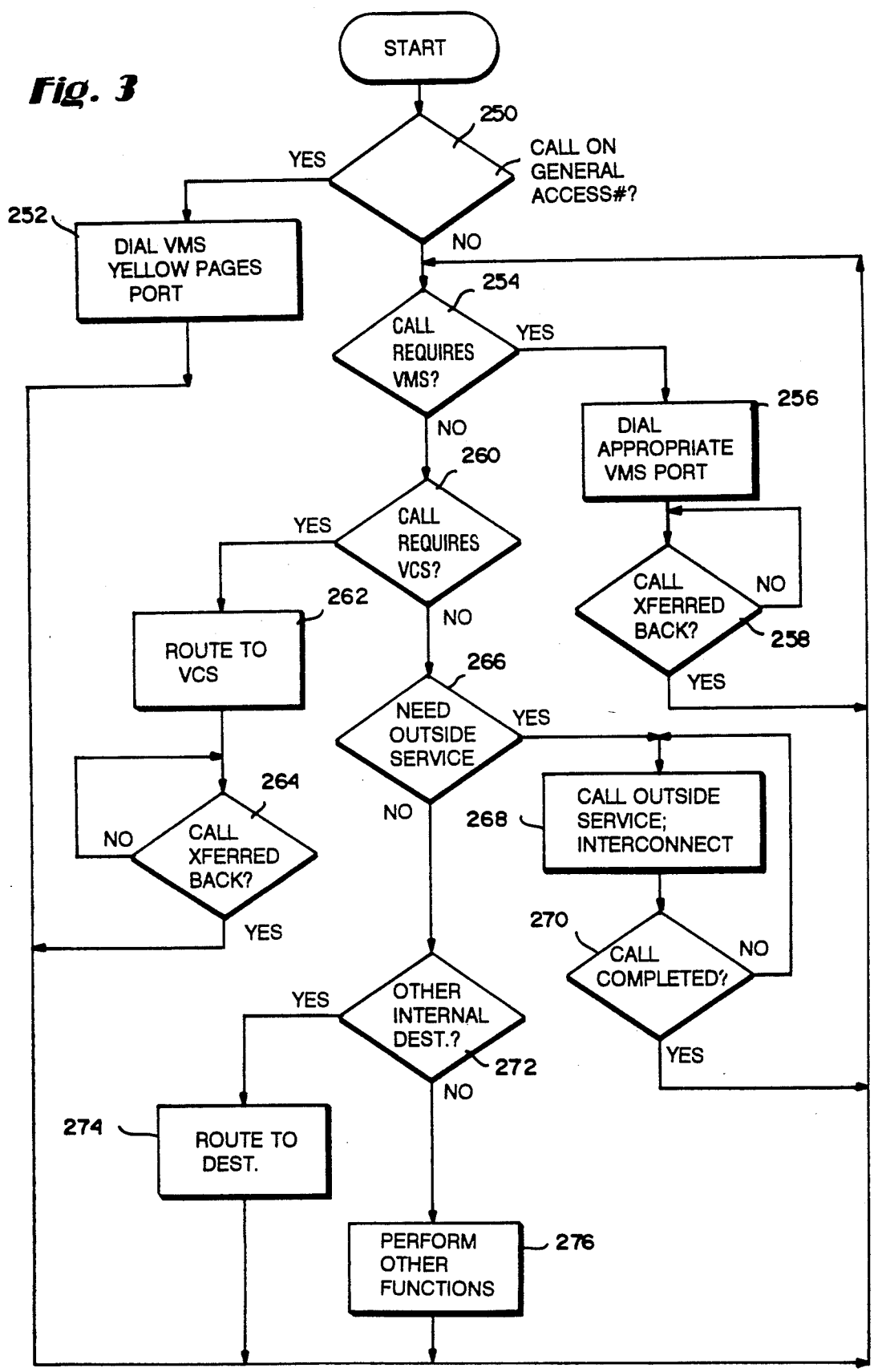
FIGS. 3-5 are schematic flowcharts of exemplary generic program control steps performed by the FIG. 1 system.

FIG. 3 is a flow chart of exemplary program control steps performed by PBX 200 shown in FIG. 1 upon receipt of a call. If the caller calls in on the general access number (e.g., 775-INFO) and is thus requesting electronic yellow pages or other "multiple service" type call handling, the PBX 200 routes the call to a port of VMS 300 dedicated to electronic yellow pages services (block 252). In the preferred embodiment, whenever the VMS 300 receives an incoming call on such dedicated ports, VMS generates a generic voice mail prompt corresponding to the electronic yellow pages (or other generic) application. If the dedicated ports are all busy, then the ACD portion of PBX 200 may route the call to a non-dedicated (i.e., general purpose) port of VMS 300 and supply VMS 300 with a one or a multi-digit DTMF phone sequence specifying electronic yellow pages application.

If the call is not received on the general access number, PBX 200 determines (based upon the line or port the PBX answered the call on) whether call requires handling by VMS 300 (decision block 254). In the preferred embodiment, some applications (e.g., in answering service application for businesses, weather or news distribution services, etc.) always require handling by the VMS 300. If such a call is received, PBX 200 routes the call to VMS 300 (either to a port of the VMS dedicated to the particular application, or to a general-usage port and in addition supplying the appropriate DTMF selection code to the VMS as described previously) (block 256).

During the time the call is connected to the VMS 300, it is still being routed through PBX 200. VMS 300 is capable of giving control of the call back to PBX 200 (e.g., for routing to another destination) in the preferred embodiment by generating "hook flash" to receive PBX dialtone and then producing a sequence of DTMF tones specifying the destination address. If a call is transferred back to PBX 200 from VMS 300 (decision block 258), the PBX may route it to any desired destination (as is demonstrated by the flow diagram). It should be noted that the "wait loop" depicted by the "N" exit of decision block 258 is not an explicit software-controlled wait loop in the preferred embodiment but rather is implemented using normal conventional PBX advanced functions such as call forwarding and "hook flash".

If the incoming call requires connection to VCS 400 (as tested for by decision block 260), PBX 200 routes the call to the VCS (block 262). In the preferred embodiment, VCS 400 is similarly capable of transferring the call to another destination via PBX 200 using, for example, "hook flash" (block 264).

Some applications require the call to be forwarded to a customer site (e.g., to customer PBX 202). For example, some customers may provide a telephone number assigned to system 100 PBX 200 as their general call-in number but may sometimes (e.g., during business hours) desire such calls to be transferred directly to their own internal PBX 202 (or, alternatively, answered by VMS 300 which then solicits a customer extension number for direct dialing by PBX 200 via the customer PBX 202). Other applications require calls to be routed directly to an outside service such as a travel agent, an airline reservation number, a hotel reservation number, or the like. When such incoming calls requiring routing to an outside service are received by PBX 200 (decision block 266), PBX 200 routes the calls by calling the outside service (possibly using the "external call forwarding" or some similar feature) and by thus maintaining control over the call throughout the call (block 268). In the preferred embodiment, upon completion of the call, the PBX 200 typically does not simply terminate the call at its conclusion but may instead reroute the call to VMS 300 for example, so that the customer can be provided with further assistance and options (decision block 270, 2.4).

Some incoming calls received by PBX 200 are to be routed to internal destinations within system 100 (e.g., human attendant telephone stations 426, earth station 208, etc.). If such other destinations are required (decision block 272), PBX 200 routes the incoming calls to those of appropriate destinations based upon the telephone number or port the call comes in on (block 274). Still other functions may be performed by PBX 200 if desired (block 276).

Figure 4:
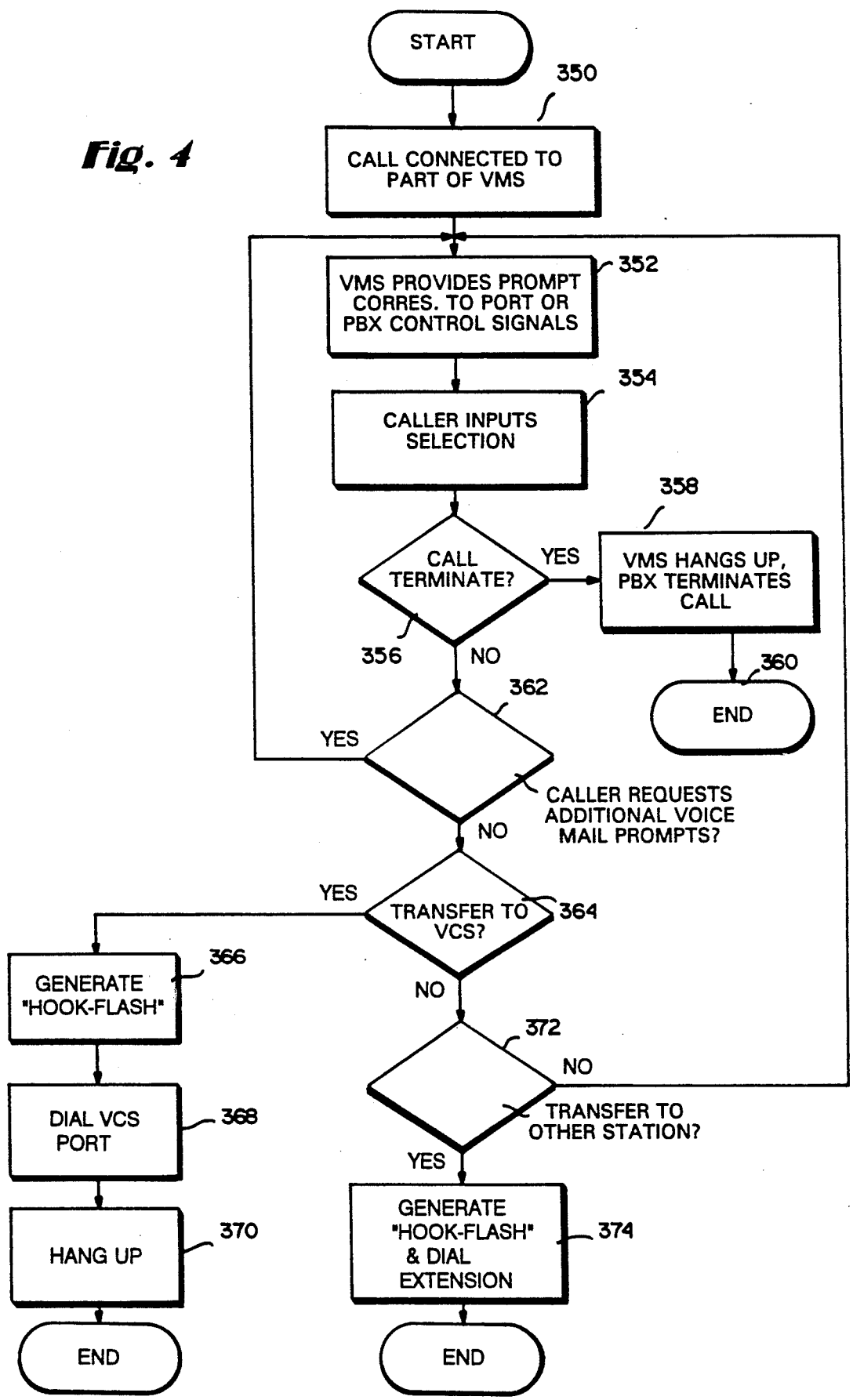

FIG. 4 is a flowchart of exemplary program control step performed by voice mail system 300 in accordance with presently preferred exemplary embodiment of the present invention. When VMS 300 receives an incoming call connected to one of its ports (block 350), it provides prerecorded voice prompts (depending upon the port number the call is connected to if that port is dedicated to a specific application or other function) or as specified by additional DTMF signals applied to the VMS over the voice line (e.g., by the caller, by the ACD function of PBX 200, by VCS 400, etc.) (block 352). Typically VMS 300 then awaits an additional selection from the caller (i.e., by the caller depressing one or more buttons on his telephone set keypad so as to specify one or a plurality of DTMF tones preassigned to different functions (block 354). Such caller selections typically are announced on the voice prompt provided by block 352 (i.e., block 352 typically provides an audio "menu" of options, one option of which the caller selects by depressing one or more TOUCH TONE keys).

If the caller decides to terminate the call (decision block 356), the VMS 300 typically "hangs-up" and may provide additional control signals to PBX 200 to alert the PBX that the call is being terminated or the PBX may simply terminate the call upon receipt of the "hang-up" signal from the VMS (block 358,360). Sometimes the caller is given the option to select an additional list of options (as tested for by decision block 362), and if the caller makes this selection VMS 300 provides a further appropriate prompt (block 352). If the caller requests an application requiring VCS 400 (as tested for by decision block 364), VMS 300 in the preferred embodiment transfers the call to VCS 400 via PBX 200 by (in the preferred embodiment) generating "hook flash" (block 366), dialing a destination corresponding to a VCS port (block 368), and then generating a "hang-up" signal (block 370). If, on the other hand, the call is to be transferred to some other destination (e.g., a human attendant telephone set 426, an extension of customer PBX 202a, etc.), VMS 300 forwards the call to that destination by using the "hook flash" signal as described previously (decision block 372,374). The options depicted by 356,374 are not exhaustive—that is, VMS 300 may provide many additional options not shown—or alternatively, in some applications fewer applications are provided than are shown in FIG. 4. FIG. 4 is intended to be merely representative of the functions provided by VMS 300 in the preferred embodiment.

Figure 5:
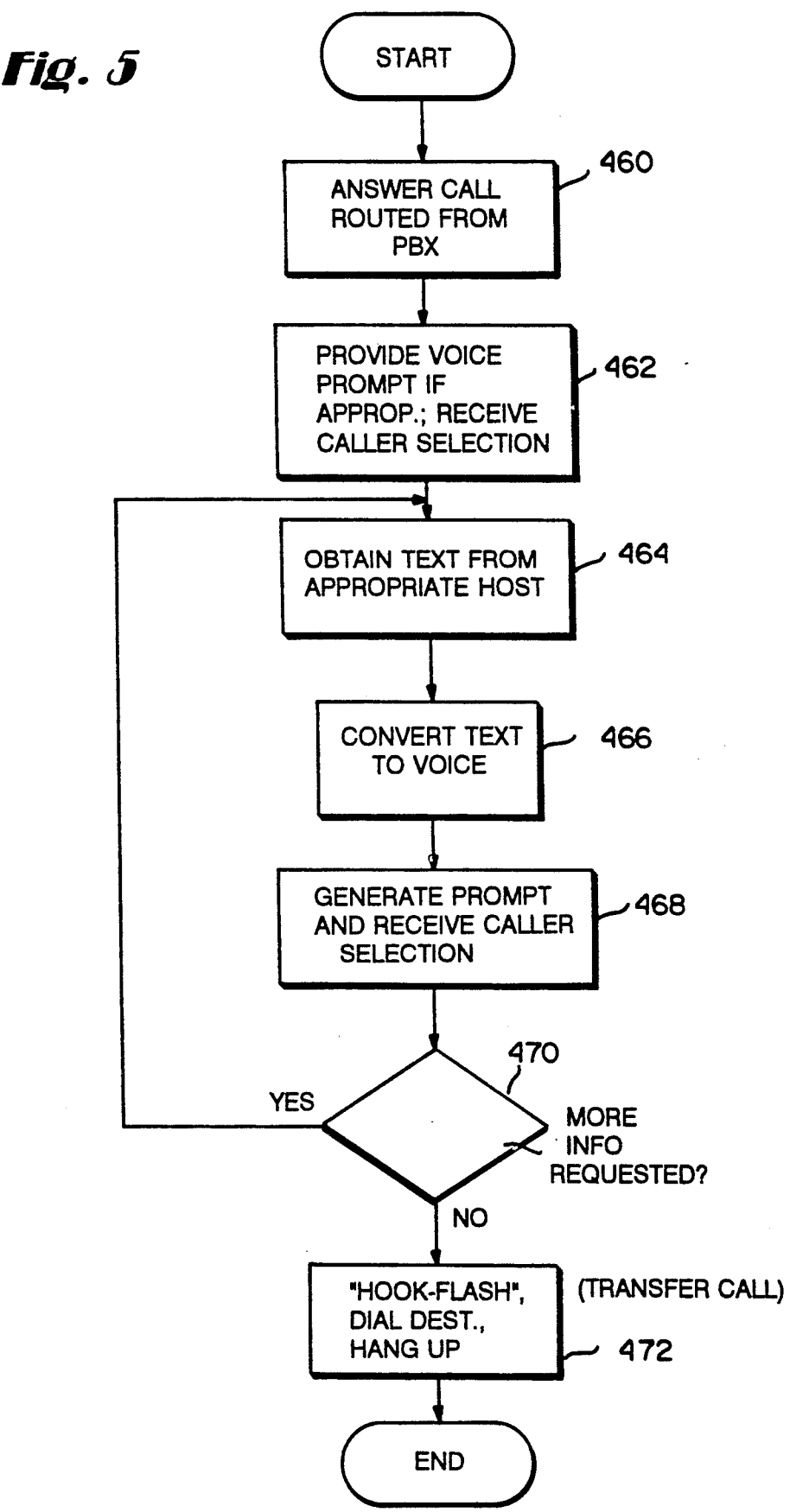

FIG. 5 is a flow chart of exemplary program control steps performed by VCS 400 in the preferred embodiment. Generally, when VCS 400 receives an incoming call on one of its ports, it answers the call (block 460). VCS 400 then, if appropriate, provides a synthesized voice prompt and may also accept a caller's input selections via DTMF tones (block 462). VCS 400 then obtains appropriate text from an appropriate host (block 464).

In the preferred embodiment, which host and which text is "appropriate" depends upon the particular application being provided (and may be selected in part by control signals provided by VMS 300, PBX 200, or by the caller himself). Performing block 464 may involve dialing up a customer host computer 404 and establishing contact with that host computer in some instances, depending upon the application. Once VCS 400 has established contact with the appropriate host and has provided various "signon" and other additional information in order to access the desired text, VCS 400 converts the obtained text voice information (block 466) into synthesized voice signals and applies the voice signals to the port on which the call has been received. If appropriate, VCS 400 may then generate a further voice prompt (block 468) and receive further caller selection.

If additional information is requested by the caller (e.g., to scroll between display screens, or to access different database records) (as tested for by decision block 470), blocks 464-466 are repeated. If, on the other hand, the caller is finished obtaining the desired information, VCS 400 may transfer the call to some other destination (e.g., to VMS 300) by generating "hook flash", dialing the destination, and then "hanging-up" (block 472).

Now that the generic steps used by system 100 to process a call have been described, several exemplary specific applications will be described in connection with the flowcharts of FIGS. 6A-11.

Figure 6A:
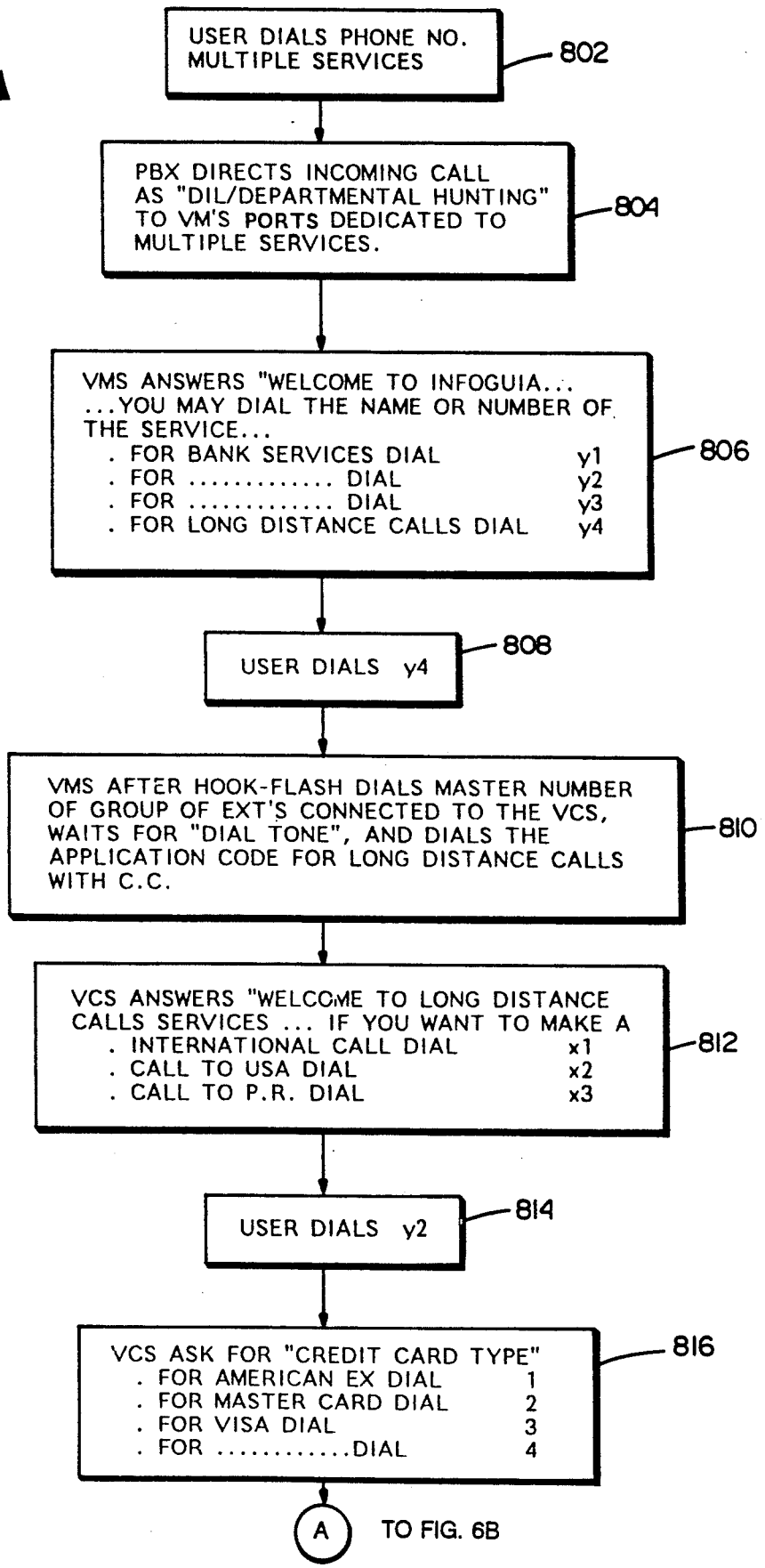

FIGS. 6A-6B together are a flowchart of exemplary program control steps performed by system 100 to process long distance calls to be charged to a credit card. In the preferred embodiment, system 100 is capable of obtaining credit card approval as well as routing long distance calls via earth station 208 or via standard communications paths, networks such as outgoing WATS lines.

When a caller dials a telephone number corresponding to an application called "multiple services" (block 802), PBX 200 answers the call and directs the call to one of the ports at VMS 300 dedicated to this particular application (block 804). VMS 300 provides a prerecorded voice prompt to the incoming call offering the caller with a number of options (e.g., "for long distance calls dial Y4") (block 806). Upon receipt of the caller's DTMF-encoded selection (block 808), VMS 300 provides the "hook flash" signal to PBX 200 and then dials a master number of a group of extensions corresponding to VCS 400, waits for a dial tone, and dials the application code for long distance calls with credit card handling (block 810).

VCS 400 answers with an audio prompt (e.g., "welcome to long distance calls services"), and then provides an audio prompt corresponding to different options the caller may select (international calls, U.S.A. calls, etc.) (block 812). Once the caller makes a selection (e.g., call the U.S.A.) (block 814), VCS 400 provides a further audio prompt (using the synthesized speech capabilities of the VCS) to request information about the type of credit card a caller intends to use (block 816). Once the caller specifies the credit card type (block 818), VCS 400 prompts the caller for his credit card number (820). The caller is then expected to dial his credit card number using his TOUCHTONE or pulse keypad (block 822), after which VCS 400 requests the expiration date of the credit card (block 824) which the caller then dials in the same manner (block 826) after which caller will be asked to dial his PIN code.

VCS 400 then, in the preferred embodiment, contacts an appropriate credit card bureau customer host computer 404 (emulating the appropriate terminal and providing the appropriate log-on and other sequences) (block 828). VCS 400 passes the credit card number and expiration date to the credit card bureau computer center and requests a transaction approval number (together with the PIN code). Once the transaction approval number is received from the credit card bureau host computer, VCS 400 invites (via synthesized speech prompts) the caller to dial the area code and the telephone number he wishes to call (block 830). When VCS 400 receives the appropriate destination numbers, the VCS generates a "hook flash", waits for PBX dial tone, and then dials the appropriate long distance telephone number (block 832). VCS 400 thus, through PBX 200, routes the incoming call to the appropriate long distance destination.

VCS 400 may then in the preferred embodiment pass to inhouse host computer system 402 (or may itself maintain) information about the call such as the credit card number and credit card type, the date and time in which the call was made, the area code and the telephone number dialed, and the price of the call. Reports of these transactions may be obtained if requested via VCS 400 and/or inhouse computer system 402. In general, ascertaining the price of the call typically may involve keeping a track of the call duration, and PBX 200 may therefore be required to monitor call duration and provide such call duration logging for later (or real-time) reconciliation with the information stored by VCS 400 and/or inhouse host computer system 402 (block 834).

Meanwhile, upon receiving the control signals provided over the voice line by VCS 400 via block 932, PBX 200 connects the caller to the called number as a "trunk-to-trunk transfer" in the preferred embodiment and is also able to provide a tone and disconnect the call at a predefined time (e.g., to allow trunk-to-trunk calls to have a preprogrammed maximum time period). As mentioned, PBX 200 may also provide an appropriate logging of each call (block 936).

Figure 7A:
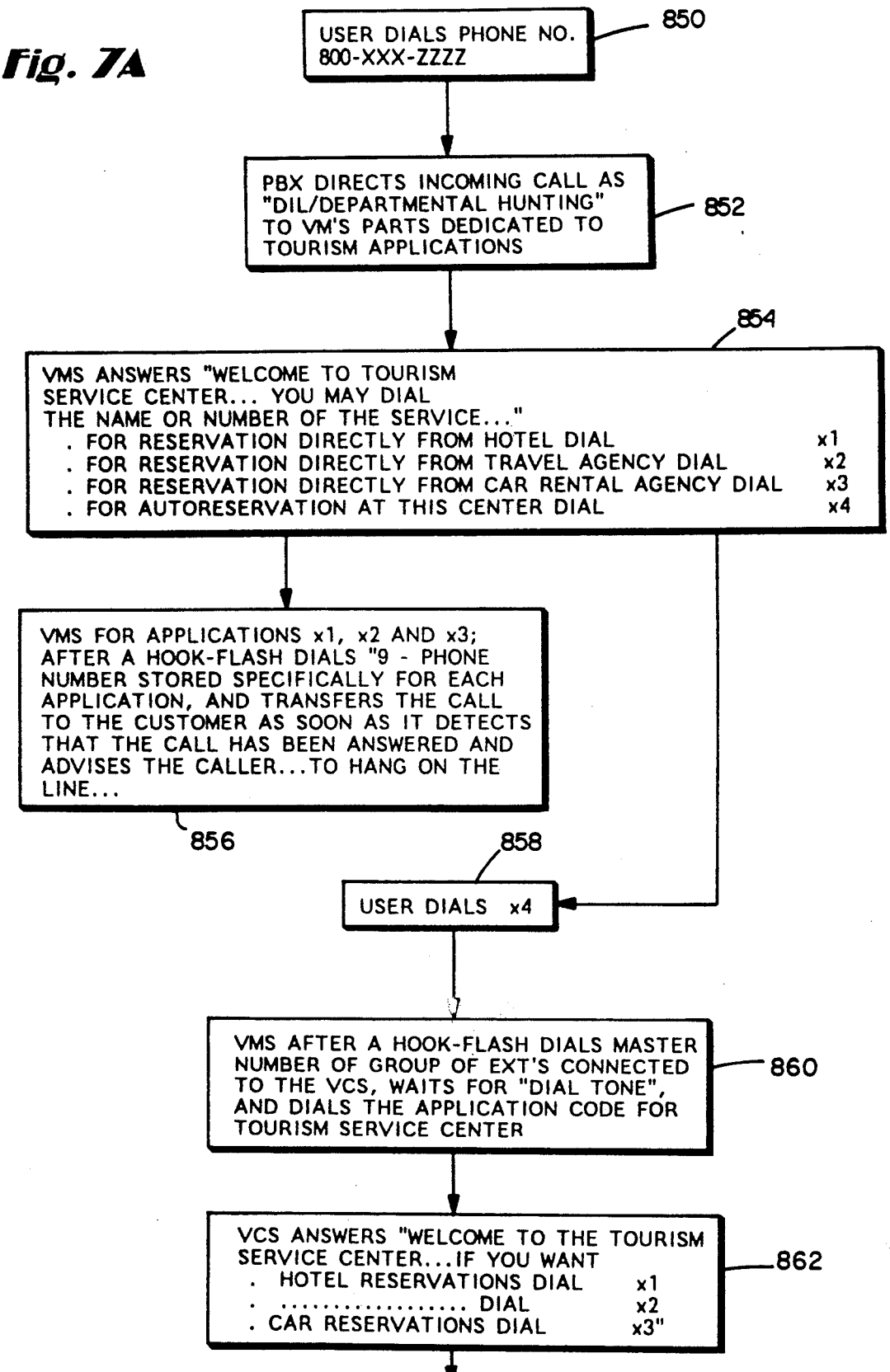
Figure 7C:
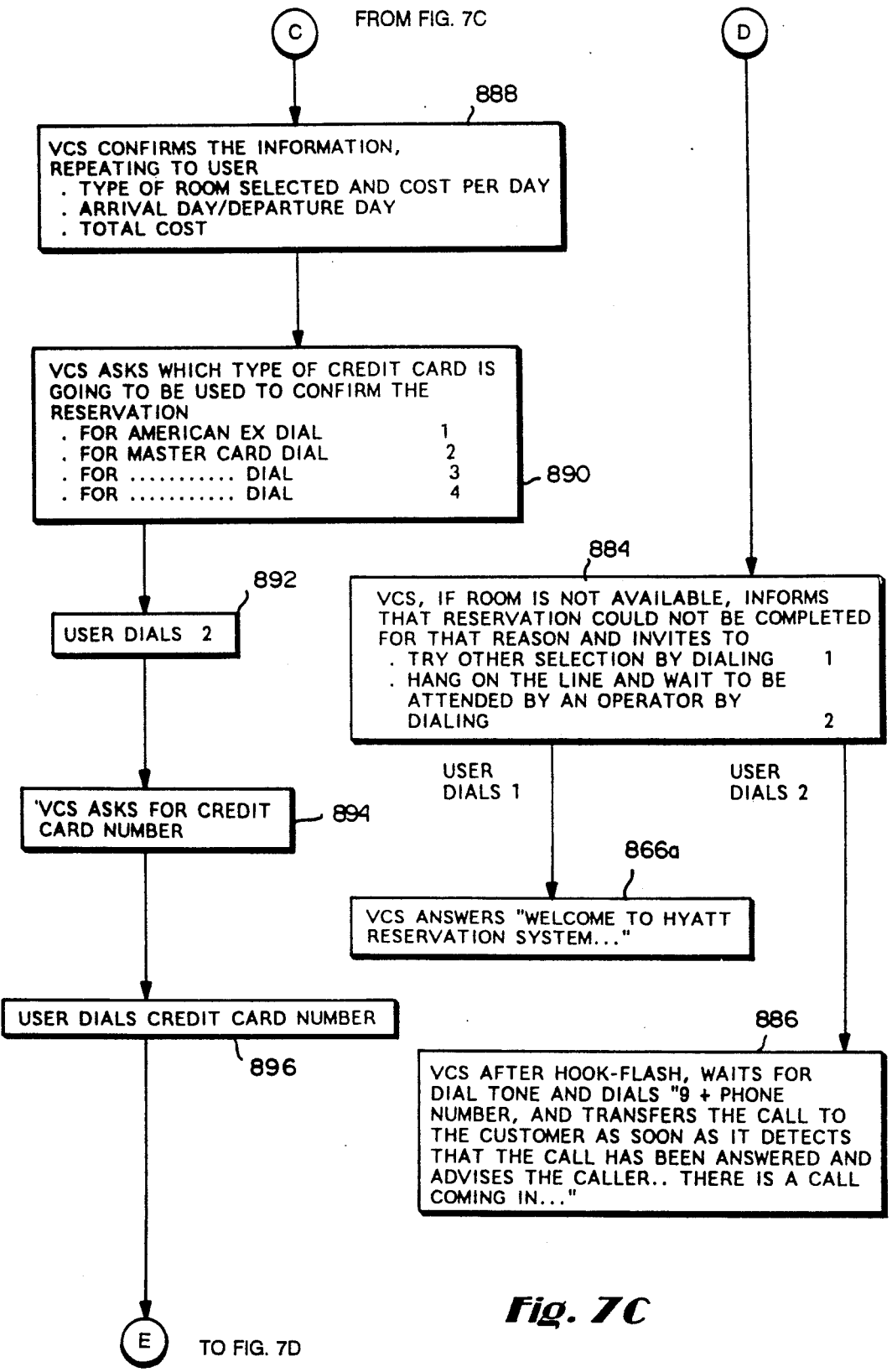
Figure 7D:
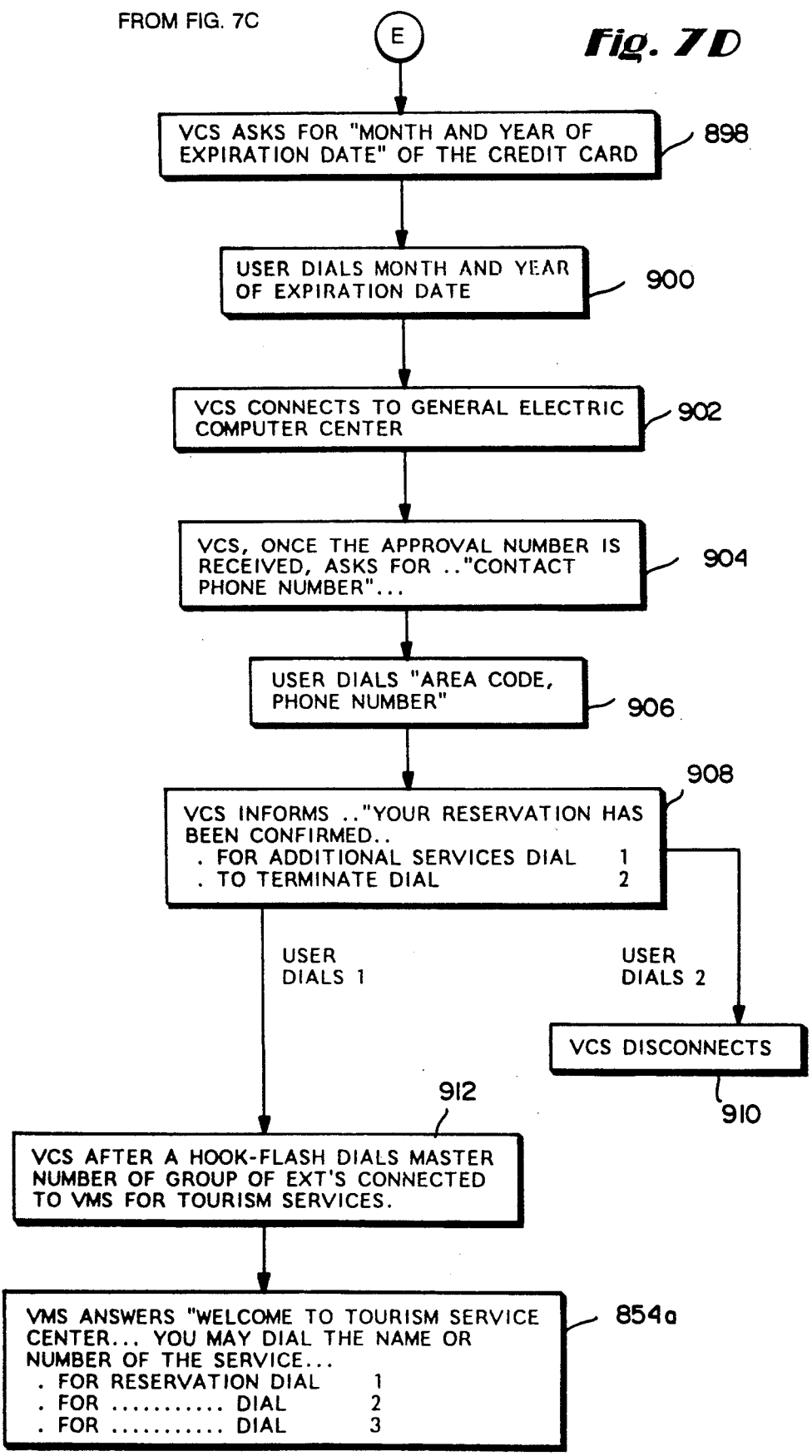
Figure 8:
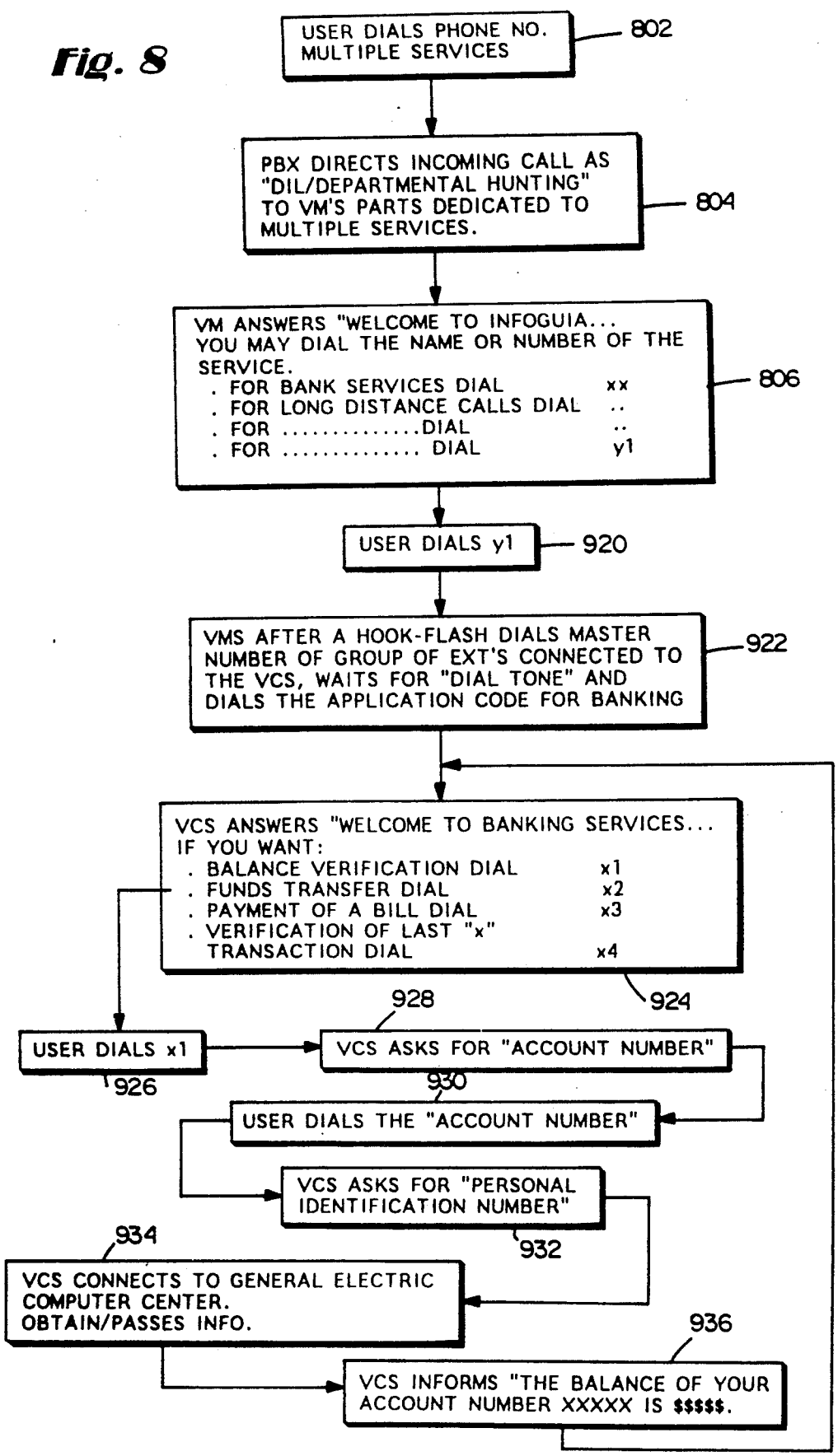

FIGS. 7A-7C together are flowcharts of 100 to provide a so-called "tourism" application—that is, a "one-stop" service for obtaining information about travel and for actually making reservations with several different travel service providers by dialing a single telephone number.

In the preferred embodiment, when a caller dials a predetermined telephone number responding to "tourism" application (e.g., 800-xxx-zzzz") (block 850), PBX 200 answers the call and directs it to a port of VMS 300 dedicated to the tourism application (block 852). VMS 300 answers the call and provides an appropriate prerecorded voice prompt presenting several options to the caller (block 854). If the caller requests an option that corresponds to an outside circuit (airline reservations, car rental, hotel reservations, etc.), VMS 300 generates a "hook flash", dials the corresponding destination, and transfers the call via PBX 200 to the corresponding destination (block 856).

In some instances, however, it may be desirable to provide an automatic reservation system via VCS 400 (e.g., by dialing "4" in the example shown) (block 858). Upon receipt of such a selection from the caller, VMS 300 transfers the call to VCS 400 and dials a DTMF application code to inform the VCS that the tourism application should be presented to the caller (block 860). VCS 400 accordingly provides a digitized speech prompt corresponding to the tourism application and presents different options to the caller for caller selection (block 862). The caller then dials in the selection he desires (e.g., hotel reservations) (block 964), in response to which VCS 400 provides an appropriate voice prompt presenting further options to the caller regarding the type of reservation he wishes to make (e.g., a single room, suite, king-size or double beds, etc.) (block 866). Upon selection of an option by the caller (block 868), VCS 400 may solicit additional information from the caller (e.g., the number of days he wishes to stay in the hotel, the arrival date, the departure date, etc.) (blocks 870-880). VCS 400 then connects to the hotel reservation host computer 404, provides the appropriate terminal emulation and access information, and verifies with the hotel chain host computer that the desired rooms are available and also determines the total cost, for example, (block 882). If the desired room is not available, VCS 400 may provide a further synthesized speech prompt informing the caller that the reservation could not be made and inviting the caller to try another selection to be connected to a human attendant (block 884). If the caller decides to try another selection, control may be returned to block 866 (see block 866a). If, on the other hand, the caller wishes to be connected to a human attendant, VCS 400 generates a "hook flash" in the preferred embodiment, and then transfers the call via PBX 200 to one of attendant stations 422 (and may also provide additional synthesized voice prompts to the human attendant indicating the nature of the call so that the caller need not explain his situation all over again to the attendant) (block 886).

If the hotel chain host computer 404 confirms the reservation, VCS 400 preferably "orally" (via synthesized speech) confirms all of the information previously provided by the caller (block 888), and then requests credit card information from the caller (blocks 890-900). VCS 400 preferably then verifies the credit card information in a manner similar to that described in conjunction with FIG. 6B (block 902). Once credit card information is received, VCS 400 asks the caller to key in a telephone number at which he can be contacted (block 904) and waits for the caller to dial in his home or business telephone number (block 906). VCS 400 then informs the caller that his reservation has been confirmed and asks the caller whether he wishes to be connected to additional services or whether the call is to terminate (block 908).

If the caller depresses a telephone number corresponding to call termination, VCS 400 simply disconnects the call (block 910). On the other hand, if the caller requests additional services, VCS 400 transfers the call back to VMS 300 and the VMS preferably answers with the prerecorded voice prompts of block 854 (block 854a).

Referring to FIGS. 8A and 8B together are a flowchart of exemplary program control steps performed by system 100 to provide banking information. The caller preferably dials the same "multiple services" telephone number described in connection with FIG. 6A (block 802) and system 100 handles the incoming call in the same manner (blocks 804-806). However, if the caller now selects bank services (e.g., by dialing the number "1" (block 920)), VMS 300 transfers the call to VCS 400 and specifies to VCS 400 the application code corresponding to the banking application (block 922). VCS 400 answers the incoming call and presents an audio prompt corresponding to selections that may be made by the caller for the banking application (e.g., balance verification, transfer between accounts, etc.) (block 924). The caller may then dial his selection (e.g., balance verification) (block 926). VCS 400 then typically requests from the caller his bank account number and his PIN (personal identification number) (blocks 928-932). Once the caller has provided such information, VCS 400 connects to an appropriate host computer 404 (e.g., a credit bureau computer or the computer of a bank) and obtains appropriate information and/or passes appropriate information onto the host computer (block 934). VCS 400 may convert information obtained from the host computer into speech (e.g., account balance (block 936)) and may provide this information to the caller. Control may then return to block 924 to provide additional options for selection by the caller.

Figure 9A:
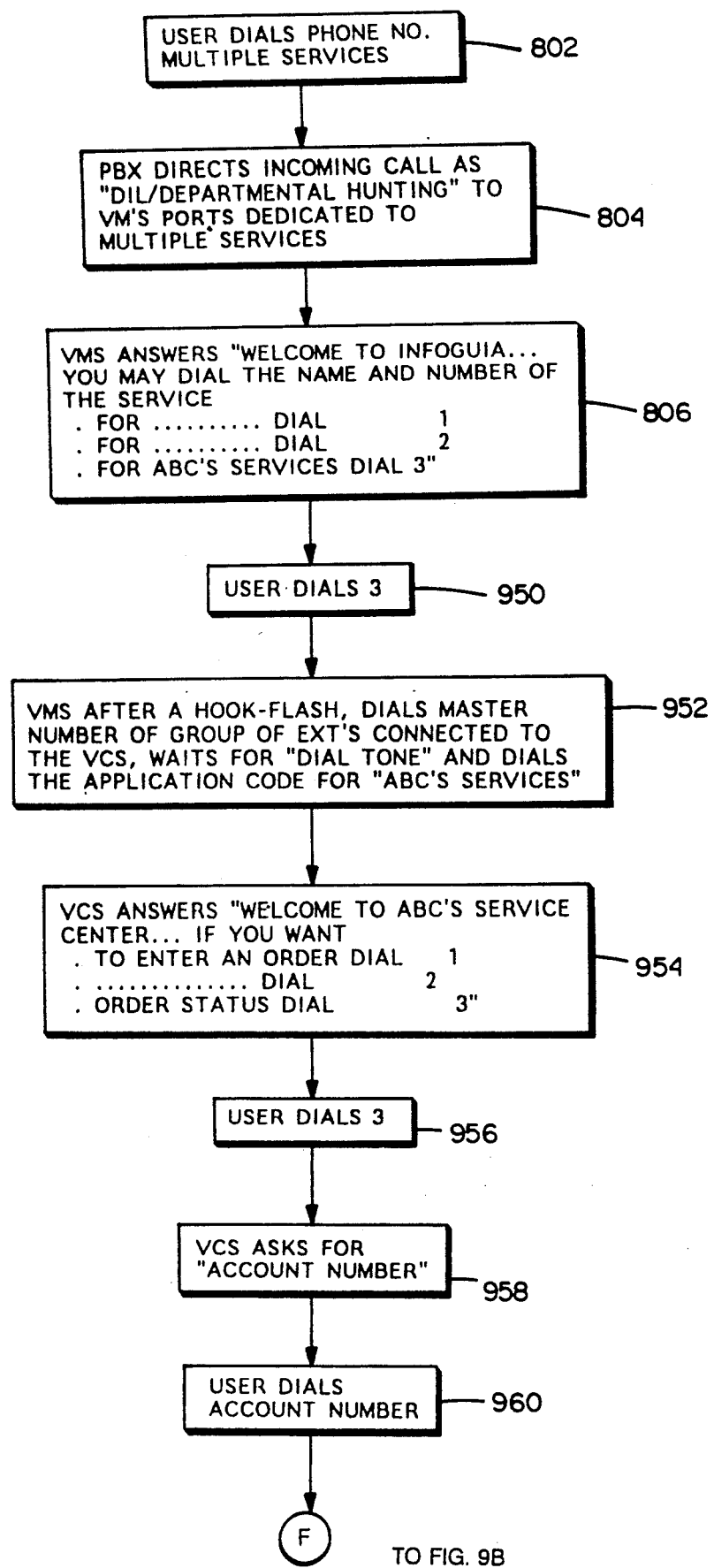
Figure 9B:
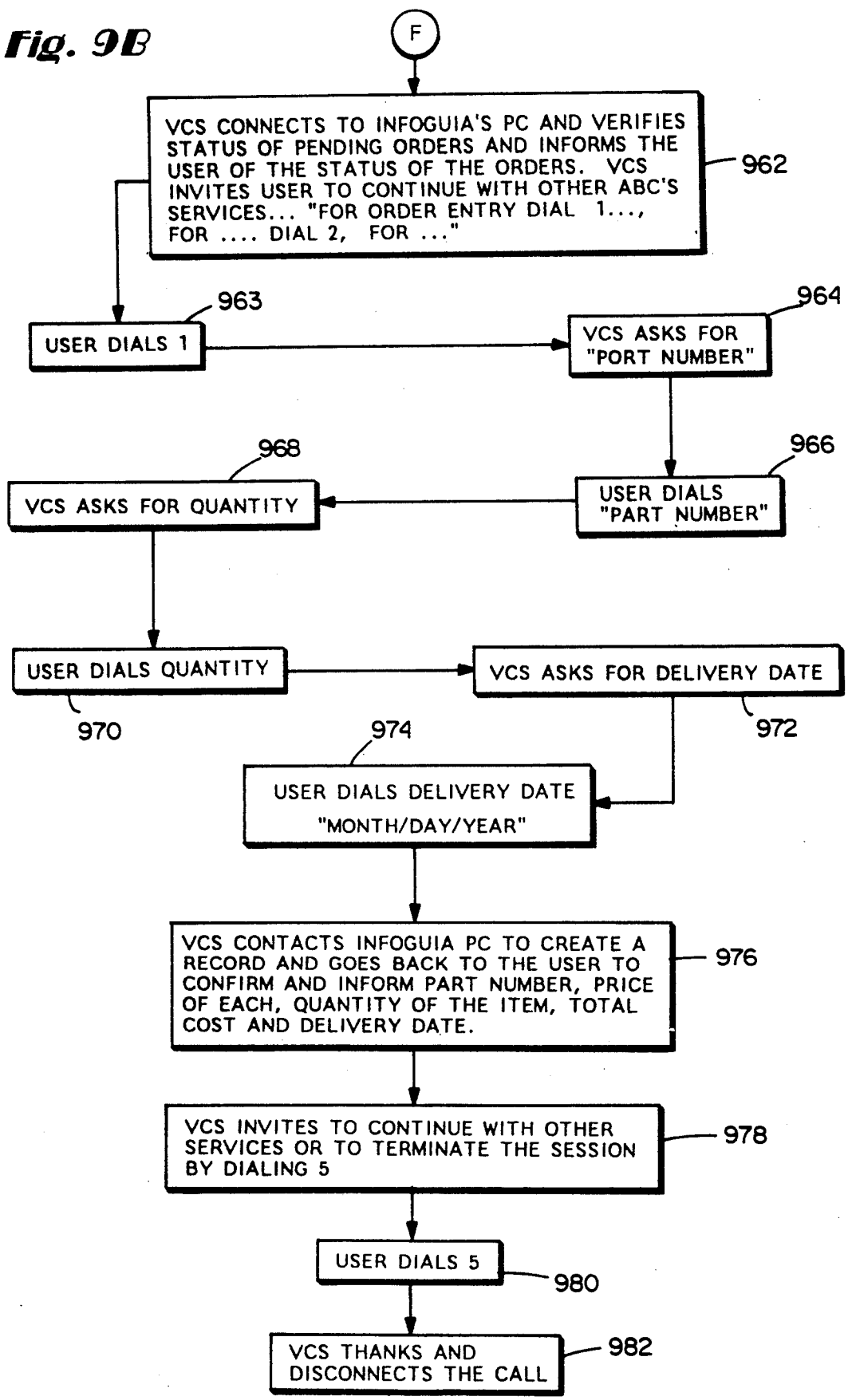

FIGS. 9A and 9B are together a flowchart of exemplary program control steps performed by system 100 to provide local database access of information stored on inhouse host computer system 402 mass storage device 418 for the purposes of "home shopping" or the like.

In the preferred embodiment, such local access may be provided under the same "multiple services" umbrella as is provided banking services and long distance credit card handling. Thus, blocks 802-806 shown in FIG. 9A are essentially the same as the corresponding blocks shown in FIGS. 6A.

Once the caller selects the local database access application (block 950), VMS 300 transfers the call to VCS 400 and dials the application code corresponding to the local application (block 952). VCS 400 may then present an appropriate digitized speech prompt (e.g, to permit home shopping in the example shown) (block 954). VCS 400 may then solicit further information from the caller (e.g., an account number so as to check the status of an order) (block 956-960). VCS 400 may then establish a connection (preferably permanently maintained with inhouse host computer system 402) and provides the appropriate information to the host computer system to obtain the information desired by the caller (block 962). VCS 400 then preferably generates the same prompt that was then generated by block 954 (block 962) to permit the caller to make another selection. If the caller now wishes to place an order (block 962), VCS 400 obtains the part number from the caller (block 964-966) along with other information pertaining to the order (e.g, quantity and delivery date information; blocks 968-974). VCS 400 then preferably passes appropriate information to inhouse host computer system 402 to create a record of the order, and also presents synthesized speech to the caller confirming the details relating to the order (block 976). Credit card information may also be solicited at this time if desired or necessary. VCS 400 may then "replay" the prompt of block 954 (block 978). Eventually, the caller will wish to terminate the call (block 980), at which time VCS 400 will provide a "thank you" digitized speech prompt and then disconnect the caller (block 982).

Figure 10:
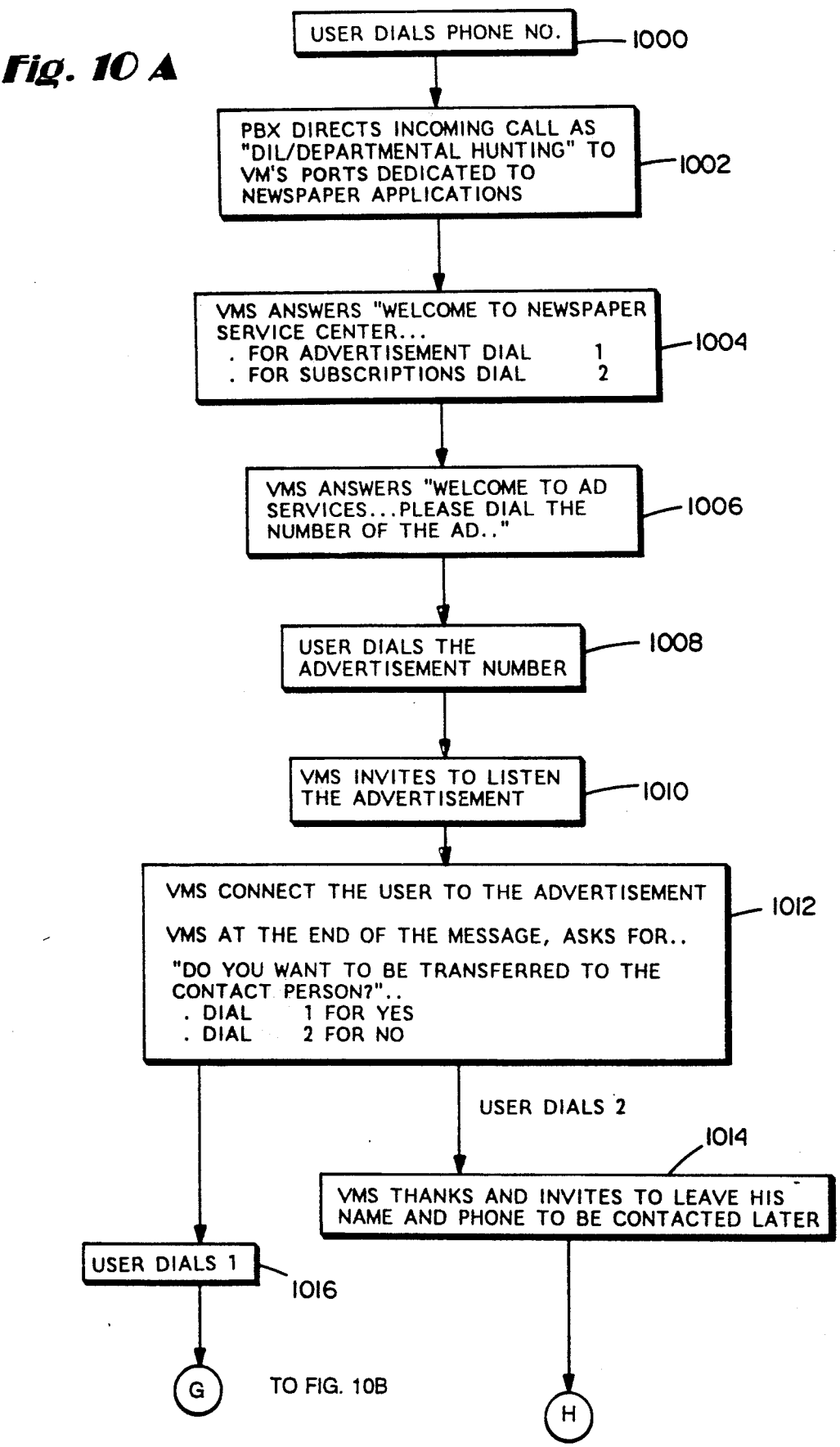
Figure 10B:
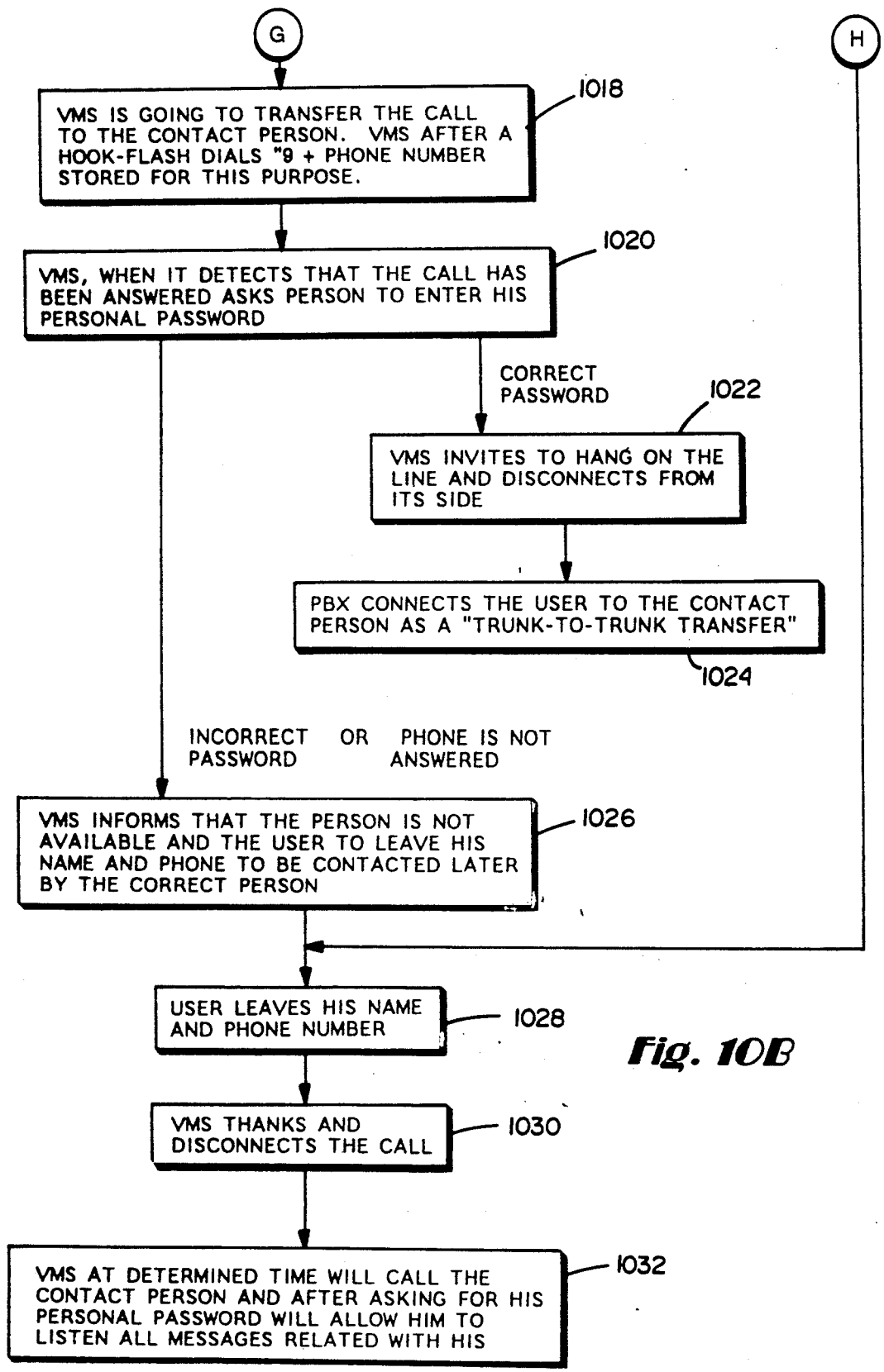

FIGS. 10A-10B together are a flow chart of an exemplary program control steps performed by system 100 to provide "on-line advertising" (the example shown is directed to an advantageous "want ads" type of advertising but can also be used for other applications).

Upon receiving a telephone call to an incoming telephone line designated for advertising (block 1000), PBX 200 directs the incoming call to a VMS 300 port (block 1002) and VMS 300 provides a prerecorded speech prompt presenting options to the caller (e.g., advertisements or subscriptions). Assuming the caller requests advertisements, VMS 300 provides a further responsive speech prompt listing advertisements available for the caller to listen to (block 1006) and then obtains from the caller a selection of the particular ad he wishes to listen to (block 1008). Several stages of menus may be presented to the user at this point to enable him to for example select categories of merchandise (e.g., automobiles), specific subsets of such categories (e.g., Fords), etc. VMS in the preferred embodiment may then provide a generic prompt inviting caller to listen to the selected ad (block 1010) and subsequently play the recorded advertisement to the caller (block 1012).

At the end of the prerecorded message, VMS 300 may asks the caller if he wishes to be transferred to a contact person (e.g., the advertiser or other person listed in the ad; block 1012). If the caller responds but he does not wish to be transferred to a contact person, VMS 300 provides a "thank you" recorded speech prompt and then invites the caller to leave his name and telephone number for later contact (block 1014). On the other hand, if the caller does wish to be connected to a contact person (block 1016), VMS 300 informs the caller that his call is going to be transferred and then actually attempts to transfer the call—typically to an outside telephone number where the contact person can be reached (block 1018).

VMS preferably monitors the call progress to ensure that the dialed number is answered and may also provide additional password protection to ensure that the person answering the telephone is in fact the contact person (block 1020). If the dialed telephone number is answered and the password is correct, VMS 300 releases the call to PBX 200 (block 1022) and PBX 200 connects the caller to the contact person as a trunk-to-trunk transfer (block 1024). If, on the other hand, the provided password is incorrect or the caller does not answer, VMS 300 informs the caller that the contact person is not presently available and invites the caller to leave his name and telephone number to be contacted later (block 1026). VMS 300 then provides standard electronic mailbox type message recording functions to permit the caller to leave his name and telephone number (block 1028), and then thanks the caller and then disconnects the call (block 1030).

In the preferred embodiment, VMS 300 at a predetermined time may initiate a call to the contact person and then after obtaining the contact person's personal password and allow the contact person to listen to all messages relating to his advertisement (block 1032).

It will be understood that the advertisement call handling service provided by the steps shown in FIGS. 10A-10B would be highly advantageous for a number of different advertising needs, particularly so-called "want ad" advertisements. Newspaper readers viewing the want ads often fail to reach the advertiser (e.g., because the contact person has taken his telephone off the hook after selling the advertised merchandise, or because he is simply not home). The advertising handling routine shown in FIGS. 10A-10B, on the other hand, provides great flexibility by screening calls (only very interested prospective sellers will initiate a transfer to the contact person) and also by an automatic callback to the contact person.

Figure 11A:
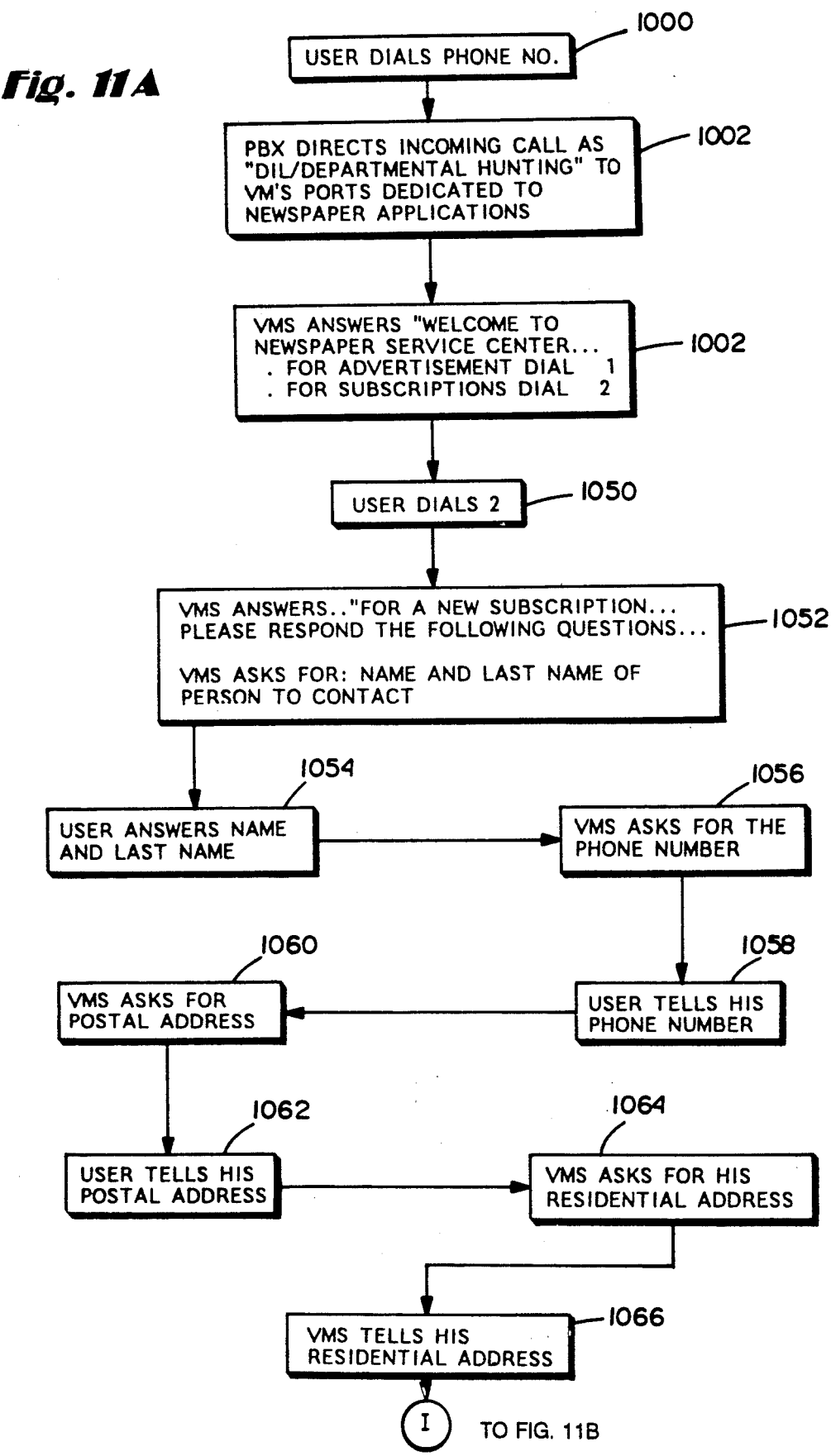
Figure 11B:
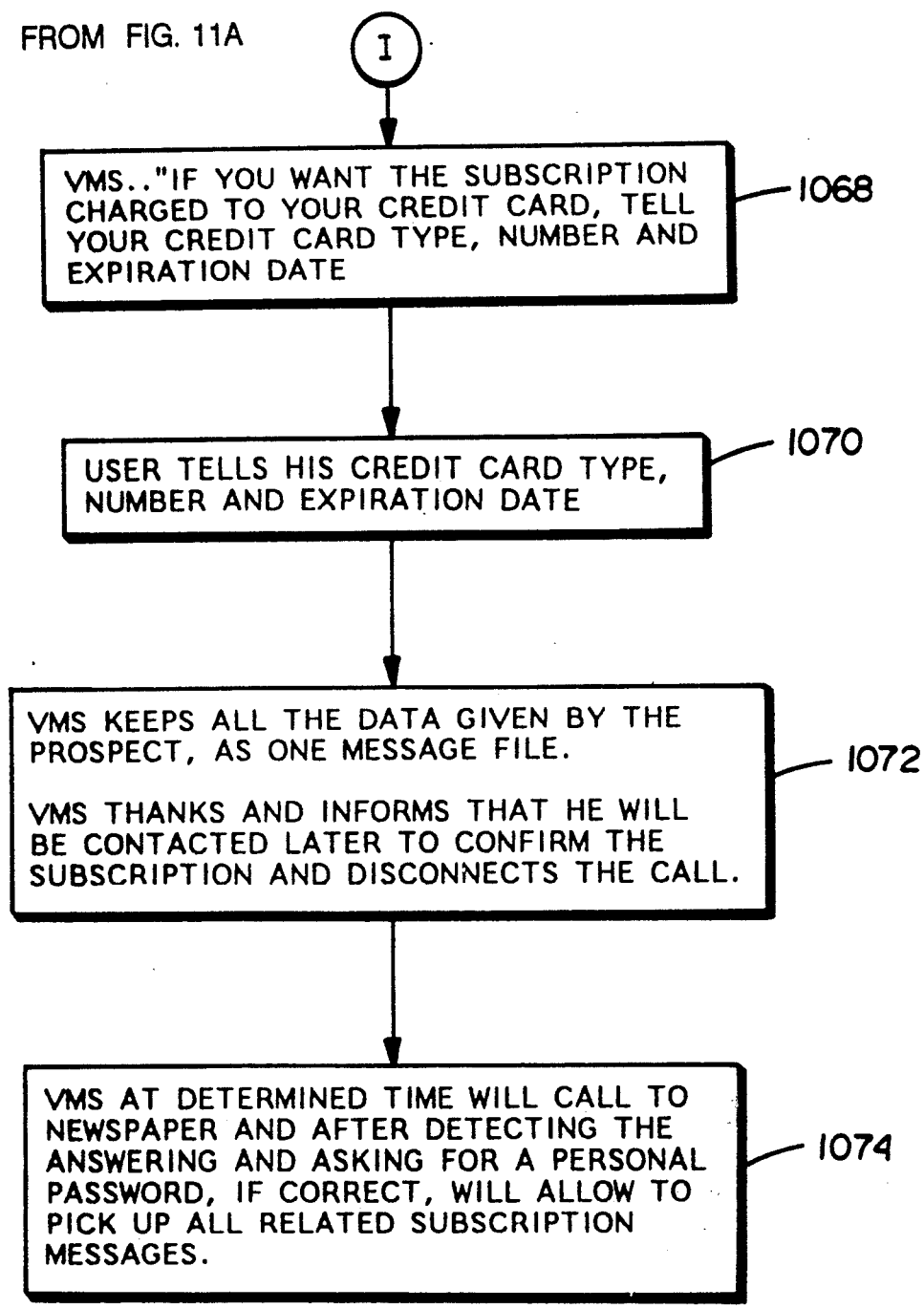

FIG. 11 is a flowchart of exemplary program control steps performed by system 100 to automatically receive and log requests for newspaper subscriptions or the like. The subscription handling and advertisement handling functions may be performed under the same umbrella as the advertising function (e.g., a newspaper may sponsor the advertising function and may also wish to automatically receive subscription orders) and thus FIG. 11 blocks 1000-1004 are identical to corresponding blocks shown in FIG. 10A.

If the caller selects subscriptions (block 1050), VMS may provide an introductory prerecorded voice prompt and then may request various information from the caller such as his name (blocks 1052-1054), his telephone number (blocks 1056-1058), his postal address (blocks 1060-1062), and his residential address (blocks 1064-1066). VMS 300 may also record spoken information from the caller about a credit card if the caller wants his subscription fee charged to his credit card (blocks 1068-1070). VMS 300 records all of the information provided by the caller in a mailbox corresponding to the newspaper or magazine, thanks the caller and then disconnects the call (block 1072). VMS 300 may be programmed to, at a predetermined time, call the subscriptions department of the newspaper or magazine and, after receiving an appropriate password, allow the person being called to listen to all of the subscriptions messages (block 1074).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for economically providing telephone services to multiple users and for cooperating with a cable television network, said system including:
    a telephone switch coupled to a telephone network, said telephone switch receiving and routing incoming telephone calls;
    voice mail means, coupled to said telephone switch, said voice mail means for automatically answering said incoming telephone calls, for selectively providing audio prompts to incoming calls connected thereto, and for selectively storing signals representing voice information received from said incoming telephone calls;
    at least one digital data storing means for storing digital data;
    voice conversion means, coupled to said telephone switch and to said digital storing means, for converting between stored digital data and audible telephone line voice signals;
    said telephone switch being preprogrammed to route incoming calls to said voice mail means and to route said incoming calls to said voice conversion means; and
    cable television network coupling means for coupling said system to said cable television network so as to permit signals to be passed between said system and said cable television network.

2. A system as in claim 1 wherein:
    said telephone switch includes control signal generating means for providing additional control signals to said voice mail means; and
    said voice mail means includes means for selecting between audio prompts in response to said additional control signals.

3. A system as in claim 2 wherein:
    said voice mail means responds to DTMF dialing signals;
    said system further includes at least one voice line coupling said telephone switch to said voice mail means; and
    said telephone switch control signal generating means comprises means for generating DTMF dialing signals and applying said generated DTMF dialing signals to said voice line, said voice mail means selecting audio prompts to provide to the caller in response to said DTMF dialing signals generated by said telephone switch.

4. A system as in claim 1 further including:
    a telephone set coupled to said telephone switch, said telephone set for dialing said voice mail means so as to establish a connection with said voice mail means and for providing additional control signals so as to initiate recording of a voice prompt by said voice mail means;
    an audio source providing high quality audio at an output thereof; and
    coupling ;means connected between said source output and said established connection for coupling the output of said high quality audio source to said established connection with substantially no loss of audio quality, the resulting audio prompt stored by the voice mail means being very high quality with reduced frequency response degradation.

5. An arrangement as in claim 4 wherein said coupling means includes:
    an audio isolation transformer having first and second windings, said first winding being coupled to said source output; and
    a high valued capacitor coupled in series between said second winding and said established connection, said series-connected capacitor coupling said second transformer winding directly to said established connection.

6. A system as in claim 1 wherein:
    said cable television network is of the type including cable television converters operable by associated cable television subscribers, said cable television converters each having at lest one suer-operable control; and
    said cable television coupling means includes data coupling means, coupled between said storing means and said cable television network, for receiving data representing information relating to cable television subscriber operation of said cable television converter user-operable controls so as to permit said cable television converters to be used as remote digital data entry terminals for said system.

7. A system as in claim 6 wherein said cable television network further includes television receivers coupled to said cable television converters, said television receivers being used to display menu/choice options for selection by operation of said cable television converter user-operable controls.

8. A system as in claim 6 wherein:
    said system further includes at least one computer coupled to said storing means; and
    said data coupling means provides said received data to said computer for storage and processing.

9. A system as in claim 8 wherein said cable television converter user-operable controls are used to generate home shopping orders, said orders being provided to said computer for storage and processing.

10. A system as in claim 6 wherein said cable television coupling means further includes means for coupling audio signals between said voice conversion means and said cable television network.

11. A system as in claim 1 wherein said cable television network coupling means includes means for coupling audio signals between said voice conversion means and said cable television network.

12. A system as in claim 11 wherein said voice conversion means generates converted audio signals based on digital data stored by said storing means, and said audio signal coupling means provides said converted audio signals to said cable television network for broadcast to cable television network subscribers.

13. A system as in claim 1 wherein said cable television coupling means provides an analog/digital interface with said cable television network so as to facilitate home shopping from cable television subscriber homes.

14. A system for providing one stop travel services by telephone, said system including:
   telephone switch means coupled to a telephone network for receiving incoming calls and routing said received calls to a voice mail system;
   said voice mail system including:
      call responding means for responding to calls routed thereto by presenting a first audio menu of travel options and processing caller originated control signals selecting any one of said presented options, and
      call transfer means coupled to said call responding means for controlling said telephone switch means to transfer said call to a selected outside travel reservation telephone number in response to said processed caller originated control signals,
   said telephone switch means including means for monitoring termination of said call transferred to said outside travel reservation telephone number and for routing said call back to said voice mail means upon such termination.

15. A system as in claim 14 wherein said call transfer means includes means for generating a hook flash signal on the received incoming call voice line and for generating, subsequent to said hook flash signal generation, a call transfer destination signal corresponding to said selected outside reservation number.

16. A system as in claim 14 wherein:
   one of said travel options comprises an auto reservation service;
   said system further includes voice conversion means for accessing a host computer, converting data stored by said host computer into audio, and providing said audio to a caller;
   said transfer means selectively routes calls to said voice conversion means in response to caller originated control signals; and
   said voice conversion means includes further call transfer means for detecting conclusion of a transaction and for selectively routing a call back to said voice mail system in response to said detected conclusion.

17. A method of providing long distance telephone service comprising the following steps:
   (a) receiving an incoming call;
   (b) directing said incoming call to a voice conversion system;
   (c) soliciting, via audio prompts, caller credit card information with said voice conversion system;
   (d) processing dialing signals provided by said caller indicative of said credit card information;
   (e) accessing, with said voice conversion system, a host computer system database storing credit card verification information and verifying said user provided credit card information with said accessed database; and
   (f) conditionally performing the following additional steps in response to verification of said user-supplied credit card information:
      (i) soliciting a long distance telephone number from said caller with said voice conversion system,
      (ii) receiving caller-originated dialing signals and temporarily storing said signals within said voice conversion system,
      (iii) providing, with said voice conversion system, a hook flash signal to a telephone switch,
      (iv) dialing said long distance telephone number with said voice conversion system in response to said stored signals,
      (v) liberating said voice conversion system from said call and connecting said caller to said dialed long distance telephone number with said telephone switch,
      (vi) monitoring the duration of said long distance call, and
      (vii) logging said caller credit card information and said monitored duration.

18. A system for economically providing services via a telephone network and a cable television network, said cable television network of the type including plural cable television subscribers, said system including:
   a telephone call handling system coupled to said telephone network, said telephone call handling system performing at least the following functions:
      (a) receiving incoming telephone calls from said telephone network,
      (b) automatically answering said incoming telephone calls,
      (c) providing audible voice prompts to said incoming calls,
      (d) storing signals representing voice information received from said incoming telephone calls, and
      (e) converting between stored digital database information and audible telephone network voice signals; and
   a cable television network coupling arrangement which couples said telephone call handling system to said cable television network, said cable television network coupling arrangement passing signals originating at said cable television network subscribers from said cable television network to said call handling system,
   said call handling system further including a processor which processes said signals passed by said cable television network coupling arrangement and which also processes said stored digital database information.

* * * * *